United States Patent
Keller et al.

(10) Patent No.: US 11,023,636 B1
(45) Date of Patent: Jun. 1, 2021

(54) METHODS, SYSTEMS, AND COMPUTER PROGRAM PRODUCT FOR CHARACTERIZING AN ELECTRONIC DESIGN WITH A SUSCEPTIBILITY WINDOW

(71) Applicant: Cadence Design Systems, Inc., San Jose, CA (US)

(72) Inventors: Igor Keller, Pleasanton, CA (US); Ratnakar Goyal, New Delhi (IN); Manuj Verma, Ghaziabad (IN); Harmandeep Singh, New Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/931,547

(22) Filed: May 13, 2020

(51) Int. Cl.
*G06F 30/3312* (2020.01)
*G06F 119/02* (2020.01)

(52) U.S. Cl.
CPC ...... *G06F 30/3312* (2020.01); *G06F 2119/02* (2020.01)

(58) Field of Classification Search
CPC .... G06F 30/327; G06F 30/367; G06F 30/398; G06F 30/3312; G06F 2219/02; G06F 2119/02; G01R 31/3016
USPC .................................................. 716/108, 113
See application file for complete search history.

(56) References Cited

U.S. PATENT DOCUMENTS

| | | | |
|---|---|---|---|
| 7,359,843 B1 | 4/2008 | Keller | |
| 7,464,349 B1 | 12/2008 | Keller | |
| 7,562,323 B1 | 7/2009 | Bai | |
| 7,761,826 B1 | 7/2010 | Thanvantri | |
| 7,882,471 B1 | 2/2011 | Kariat | |
| 7,983,891 B1 | 7/2011 | Keller | |
| 8,104,006 B2 | 1/2012 | Kariat | |
| 8,239,798 B1 | 8/2012 | Goyal | |
| 8,543,954 B1 | 9/2013 | Keller | |
| 8,615,725 B1 | 12/2013 | Keller | |
| 8,726,211 B2 | 5/2014 | Phillips | |
| 8,782,583 B1 | 7/2014 | Tiwary | |
| 8,924,905 B1 | 12/2014 | Keller | |
| 8,938,703 B1 | 1/2015 | Saurabh | |
| 8,966,421 B1 | 2/2015 | Kariat | |
| 9,003,342 B1 | 4/2015 | Keller | |
| 9,129,078 B1 | 9/2015 | Keller | |
| 9,384,310 B1 | 7/2016 | Keller | |
| 9,529,962 B1 | 12/2016 | Dhuria | |
| 9,582,626 B1 | 2/2017 | Keller | |

(Continued)

*Primary Examiner* — Paul Dinh

(74) *Attorney, Agent, or Firm* — Vista IP Law Group, LLP

(57) ABSTRACT

Disclosed are methods, systems, and articles of manufacture for characterizing an electronic design with a susceptibility window. These techniques identify a set of multiple aggressors in an electronic design and determine, at a susceptibility window module stored in memory and executing in conjunction with a microprocessor of a computing node, a susceptibility window for an internal node of a victim and a timing window for the set of multiple aggressors in the electronic design. These techniques further determine a subset having at least one aggressor using at least the susceptibility window of the victim and the timing window for the set of multiple aggressors, and determine whether a glitch in the electronic design causes a violation at the internal node of the electronic design based at least in part upon the timing window and the susceptibility.

22 Claims, 15 Drawing Sheets

(56) References Cited

U.S. PATENT DOCUMENTS

| | | | |
|---|---|---|---|
| 9,589,096 B1 | 3/2017 | Gupta | |
| 9,710,593 B1 | 7/2017 | Keller | |
| 9,881,123 B1 | 1/2018 | Goyal | |
| 9,928,324 B1 | 3/2018 | Keller | |
| 10,031,986 B1 | 7/2018 | Kumar | |
| 10,073,934 B1 | 9/2018 | Keller | |
| 10,185,795 B1 | 1/2019 | Keller | |
| 10,192,012 B1 | 1/2019 | Wehbeh | |
| 10,275,554 B1 | 4/2019 | Chetin | |
| 10,289,774 B1 | 5/2019 | Yadav | |
| 10,430,536 B1 | 10/2019 | Keller | |
| 10,789,406 B1 | 9/2020 | Raja | |
| 2003/0070150 A1* | 4/2003 | Allen | G06F 30/3312 716/108 |
| 2003/0229873 A1* | 12/2003 | Casavant | G06F 30/327 716/115 |
| 2004/0015338 A1* | 1/2004 | Lawrence | G06F 30/367 703/13 |
| 2004/0158421 A1* | 8/2004 | Iwanishi | G01R 31/3016 702/69 |
| 2007/0277131 A1* | 11/2007 | Schaeffer | G06F 30/3312 716/113 |
| 2008/0163145 A1* | 7/2008 | Zarkesh-Ha | G06F 30/367 716/115 |
| 2009/0228851 A1* | 9/2009 | Abbaspour | G06F 30/367 716/113 |
| 2017/0061059 A1* | 3/2017 | Gregerson | G06F 30/398 |

\* cited by examiner

METHODS, SYSTEMS, AND COMPUTER PROGRAM PRODUCT FOR CHARACTERIZING AN ELECTRONIC DESIGN WITH A SUSCEPTIBILITY WINDOW

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high-level behavior description of the IC device and translates this high-level design description into netlists at various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

As electronic designs become more and more complex with very little or no room for silicon recall due to prohibitive cost, designers tend to spend much time during the early design stages doing prototyping and floorplanning by, for example, performing various what-if analyses and/or manual adjustment during the floorplanning stage. When performing the what-if analyses or manual floorplan adjustments, a designer may spend a significant amount of time awaiting the results of each floorplan iteration. For example, a designer may identify a critical path that fails to meet the available slack for the path and thus need to move one or more instances connected by the path to satisfy the timing requirements.

The design in this case may need to calculate the new distance after moving the one or more instances, check whether moving the one or more instances does not create additional critical path(s). The designer may often need to run additional timing commands due to the unavailability of timing information for these paths that are made critical due to the moving of the one or more instances. Once the timing or slack information or data for these additional path(s) is determined, the designer may need to determine whether one or more other components or models in the same electronic design may need to be moved to make sure that no additional paths violate the timing requirements due to the designer's moving the one or more instances in the floorplan. The designer may encounter similar issues at this stage due to the lack of timing information for one or more paths connecting these one or more other components or models. Consequently, a designer may spend up to 70% of the total design cycle time and days or even weeks during the prototyping and floorplanning stage.

Conventional approaches perform glitch analyses yet suffers from several shortcomings and difficulties. Modern glitch analyses often first collect aggressors based on the respective strengths of the aggressors and calculate the individual glitch based on a holding admittance of driver, which may be weakened by an input glitch, through individual glitch simulation. An aggressor may include, for example, a net that switches its state.

These analyses then repeat the same or substantially similar collection and calculations for the remaining aggressors in an electronic design to obtain the respective individual, simulated glitches. Some of these conventional glitch analyses may further filter out one or more aggressors based on the individual, simulated glitches, logical correlation, and overlapping aggressor windows. These modern glitch analyses then compute propagated glitch by simulating the driver of an aggressor with an input glitch and by keeping the remaining aggressors quiet. With the propagated glitch computed, these conventional approaches align and combine aggressors with propagated glitch in a worst possible manner for each receiver, and determine whether the combined glitch causes a violation on each receiver by using, for example, a failure criterion. The results may then be stored for subsequent reporting.

These conventional approaches suffer from several shortcomings and problems. For example, some conventional approaches use only aggressors' timing windows to constrain the aggressors and do not constrain victim net(s). Therefore, these approaches only select a group of aggressors that may cause the largest glitch when aligned according to their respective constraints. Nonetheless, when a glitch arrives ad a D-pin of a flipflop, the glitch does not necessarily cause any damage because the first latch of the flipflop oftentimes is not transparent to input signals. That is, the glitch may propagate into the flipflop when the latch opens for input. Because a glitch recovers quickly, the glitch may cause a damage (e.g., changing the internal state of a flipflop and hence the value stored) when the glitch may need to arrive at a time that is sufficiently close to the closing edge of the clock signal so that there is insufficient time for the glitch to recover before the clock signal closes. Therefore, conventional glitch analyses often fall prey to being overly pessimistic.

Some modern approaches attempt to address these problems and shortcomings of conventional approaches by constraining and/or adjusting aggressors' timing windows. Nonetheless, these modern approaches also fall short in either being overly pessimistic or being overly optimistic. Moreover, these modern approaches still fail to provide efficient or effective solutions to address the aforementioned problems and shortcomings of conventional approaches. For example, some of these approaches are unable to or have difficulties in determining a timing window for an internal net or an internal node of a net of an electronic design. Some of these approaches are unable to or have difficulties in properly constraining timing windows to avoid over pessimism or over optimism. Some of these approaches attempt to provide more accurate timing analysis or delay calculation results by incorporating aggressors that may contribute to crosstalk noise yet are unable to or have difficulties in curtailing aggressors to avoid data explosion problems. Some of these approaches are unable to or have difficulties in aligning a propagated glitch with coupling glitch(es) from remaining aggressor(s) under the constraint(s) of an aggressor's timing window to reduce pessimism. More importantly, no conventional approaches account for the arrival time of a glitch at a node in a victim net.

Thus, there is a need for methods, systems, and computer program products for characterizing an electronic design with a susceptibility window in a more accurate, efficient, and effective manner and to address at least the aforementioned issues and shortcomings.

SUMMARY

Disclosed are method(s), system(s), and article(s) of manufacture for characterizing an electronic design with a susceptibility window in one or more embodiments. Some embodiments are directed at a method for characterizing an electronic design with a susceptibility window. These embodiments identify a set of multiple aggressors in an electronic design and determine, at a susceptibility window module stored in memory and executing in conjunction with a microprocessor of a computing node, a susceptibility window for an internal node of a victim and a timing window for the set of multiple aggressors in the electronic design. These techniques further determine a subset having at least one aggressor using at least the susceptibility window of the victim and the timing window for the set of multiple aggressors, and determine whether a glitch in the electronic design causes a violation at the internal node of the electronic design based at least in part upon the timing window and the susceptibility.

To determine a susceptibility window, some embodiments determine a first timing window at a first location, propagate the first timing window for the victim backwards for the internal node along a net or a net segment on which the internal node is located, and determine the susceptibility window for the internal node of the victim based at least in part upon the first timing window.

In some of these embodiments, a clock period for a node on the net or the net segment is identified to determine the susceptibility window for the internal node of the victim. A complementary window may then be determined for the node based at least in part upon the clock period and the timing window. A first susceptibility window may be determined for the node based at least in part upon the complementary window; and the susceptibility window may be determined for the internal node at least by propagating the first susceptibility window for the node backward from the node to the internal node along the net or the net segment.

To determine the timing window for the set of multiple aggressors, some embodiments determine a first timing window at a first location, propagate the first timing window for the set of multiple aggressors backwards along one or more nets or one or more net segments on which the set of multiple aggressors is located, and determine the timing window for the set of multiple aggressors based at least in part upon the first timing window.

In some of these embodiments, a clock period for a node on the net or the net segment is identified to determine the timing window for the set of multiple aggressors. A complementary window may then be determined for the node based at least in part upon the clock period and the timing window. A separate timing window for the node based at least in part upon the complementary window; and the timing window for the set of aggressors at least by propagating the separate timing window for the node backward along the one or more nets or the one or more net segments.

To characterize an electronic design with a susceptibility window, a grid of events having one or more segments may be determined based at least in part upon the timing window of the set of multiple aggressors. For a segment of the one or more segments of the grid of events, determining a respective set of one or more aggressors that are active in the segment of the one or more segments of the grid of events. A first segment from the one or more segments based at least in part upon the timing window of the respective set of one or more aggressors and further on the susceptibility window of the victim.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
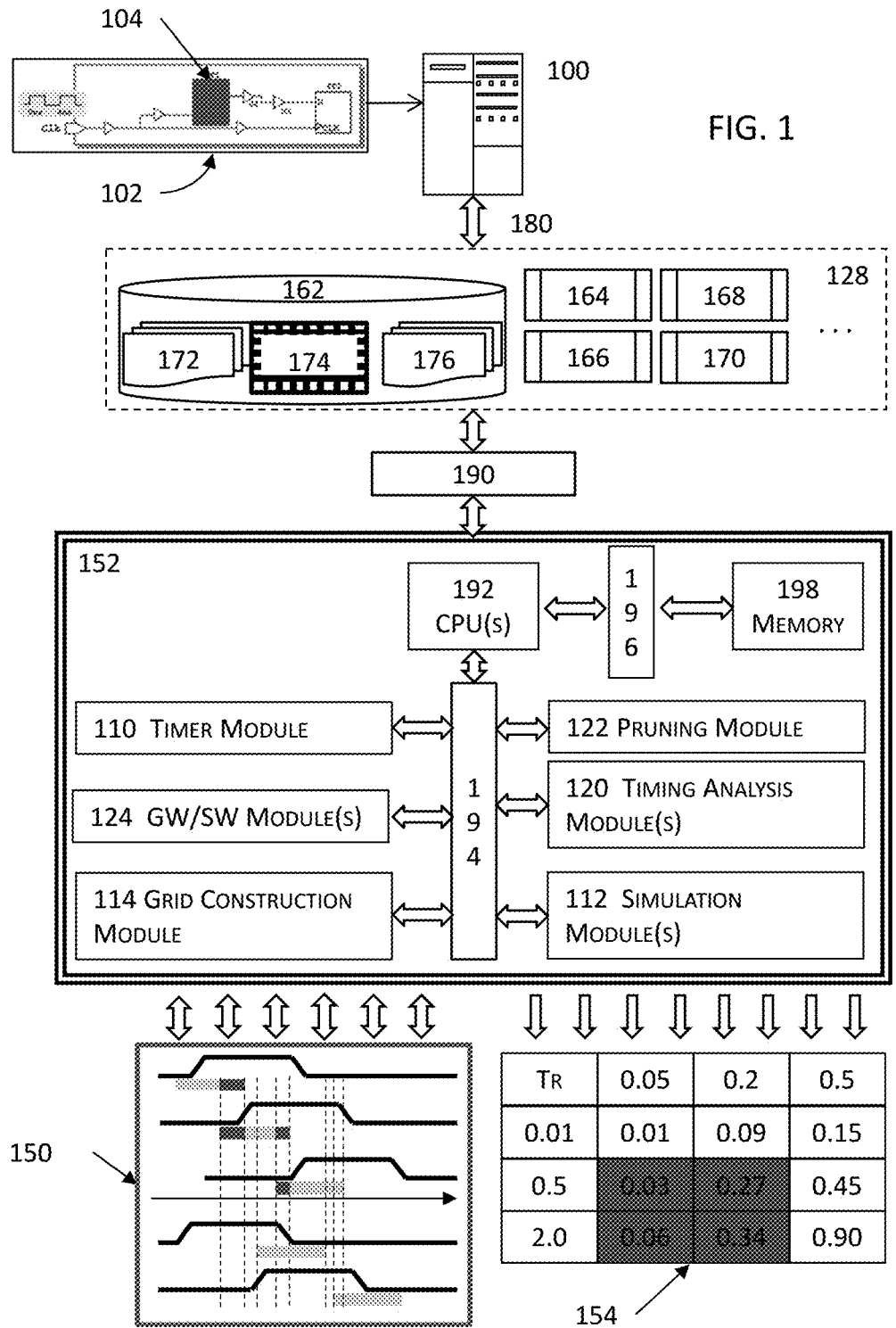
FIG. 1 illustrates a high-level block diagram of a simplified system for characterizing an electronic design with a susceptibility window in one or more embodiments.

Various embodiments described herein are directed to characterizing an electronic design with a susceptibility window. Rather than constraining only aggressors without considering whether a victim may be negatively affected by the switching of one or more aggressors, various embodiments account for not only aggressors (or attackers) but also a victim of interest and use both the timing window of an aggressor and a susceptibility window (which is also interchangeably referenced herein as a glitch window) of the victim to determine a subset of aggressor(s) for the victim circuit component of interest or to filter out one or more aggressors from a set of initially identified aggressors for one or more timing analyses to produce more efficient and expedient predictions of timing behaviors without compromising accuracy. In some embodiments, the subset of aggressor(s) for the victim circuit component of interest is the entire set of aggressors. In some other embodiments, the subset of aggressor(s) for the victim circuit component of interest is a proper subset of the entire set of aggressors from which the subset is determined.

These embodiments first collect a set of aggressors (e.g., an aggressor net or an aggressor net segment) in an electronic design. A timer module or engine may then determine a timing window for each of the aggressors in the collected set of aggressors. For example, a timer engine may determine a required time window (RTW) of an aggressor. It shall be noted that not all of the aggressors in the identified set of aggressors need to be forward to a timing analysis or a delay calculation engine or module for timing analyses or delay calculations.

The signal transition of an aggressor may cause capacitive crosstalk and hence induce an electric current or a positive or negative voltage spike in a nearby victim circuit component within some close proximity of the aggressor. Such an electric current or voltage spike is generally referred to as a glitch. Depending on the time when a glitch arrives in a circuit component, a glitch may or may not necessarily be harmful to the victim circuit component. For example, a glitch, if arriving after a gate of a flip-flop is closed in a clock period, the glitch may not cause any damage to the flip-flop (e.g., causing a faulty value to be latched in).

Not all glitches that arrive after the gate of a flip-flop is open necessarily cause damage to the flip-flop. For example, if the gate remains open for a sufficiently long period time so that the glitch recovers before the gate is closed, the glitch also may not cause damage to the flip-flop. Nonetheless, if a glitch arrives at a time when the gate is open but does not remain open for a sufficiently long period of time for the glitch to recover, the glitch may thus change the internal state of the flip-flop without being able to recover in time before the gate is closed. In this latter scenario, the glitch may cause a faulty-value to be latched in and thus a violation.

Unlike conventional approaches that focus solely on various characteristics and/or constraints of aggressors, various embodiments further identify a victim circuit component (e.g., a victim net or a victim net segment) and determine a glitch window (or a susceptibility window) of a victim circuit component, in addition to the timing windows of the identified aggressors. A susceptibility window or glitch window may be defined on a net (e.g., a data-path net) or a node along a net or net segment to include a timing window during which a glitch, when occurs, may propagate into a sequential element and cause an incorrect value in the sequential element. For example, a glitch window of at a node may include a timing window within which a glitch may cause damage (e.g., causing a faulty value to be latched in) to the victim circuit component.

With the glitch window of a victim circuit component and timing windows of the initially identified set of aggressors determined, some embodiments select a smaller subset of aggressor(s) from the initially identified set of aggressors based at least in part upon the glitch window of the victim circuit component. Some other embodiments filter out one or more aggressors from the initially identified set of aggressors based at least in part upon the glitch window of the victim circuit component to generate a reduced set of aggressor(s). This smaller subset of aggressor(s) (in the former embodiments) or the reduced set of aggressor(s) (in the latter embodiments) may then be provided to a timing analysis or a delay calculation module or engine that characterizes the timing behaviors with one or more timing analyses.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration. It shall be noted that various features and techniques are described hereinafter in terms of embodiments and/or examples. Unless otherwise explicitly described as mutually exclusive, any embodiment, example, feature, and/or characteristic described herein may be readily combined in any suitable manner with any other embodiment, example, feature, and/or characteristic, without departing from the scope or spirit of the present inventions. All such modifications are intended to be within the scope of claims associated with this disclosure.

FIG. 1 illustrates a high-level block diagram of a simplified system for characterizing an electronic design with a susceptibility window in one or more embodiments. More specifically, the computing system 100 in FIG. 1 may comprise one or more physical computing systems or virtual machines 100, such as a general-purpose computer described in the System Architecture Overview section to implement one or more special proposes. The illustrative system in FIG. 1 may include an Internet-based computing platform providing a shared pool of configurable computer processing resources (e.g., computer networks, servers, storage, applications, services, etc.) and data to other computers and devices in a ubiquitous, on-demand basis via the Internet. For example, one or more computing resources and/or modules illustrated in FIG. 1 may be located in a cloud computing platform where computing resources (e.g., storage resources, compute resources, etc.) are provided on an on-demand basis without direct active management by users in some embodiments.

In this system illustrated in FIG. 1, one or more computing systems 100 may invoke and execute various modules to identify an electronic design 102 (e.g., a schematic design including one or more hierarchical levels in one or more design fabrics, etc.) as well as a circuit component of interest 104 in the electronic design. The one or more computing systems 100 may invoke and execute a plurality of modules 152, which are specifically programmed and stored at least partially in memory of and functions in conjunction with at least one microprocessor (e.g., 192) or processor core of the one or more computing systems 100, to perform various functions to identify an initial set of aggressors based at least in part upon, for example, the respective strengths of the initial set of aggressors and further select a subset of aggressors 150 from an initial set of aggressors in the electronic design 102.

This subset of aggressors may further be provided back to one or more modules in the plurality of modules 152 which may further perform one or more analyses with the subset of aggressors to characterize the circuit component of interest 104, the electronic design 102, or a portion thereof. For example, a timing analysis or a delay calculation module or engine 120 may perform a timing analysis or a delay calculation to characterize the timing behavior 154 of the electronic design 102 or at least a portion thereof (e.g., for one or more internal node 104 in the electronic design).

Moreover, the one or more computing systems 100 may execute timer module (110) that performs various functions pertaining to timing characterization. For example, a timer module 110 may determine various timing windows (e.g., a required time window or RTW) of various circuit component. A timer module 110 may also propagate (in the forward and/or backward direction) a determined timing window (e.g., an RTW, a glitch or susceptibility window, etc.) along a net or a segment thereof to one or more internal nodes by repeatedly adding or subtracting delays or other timing characteristics into or from the corresponding timing characteristics of the timing window. It shall be noted that the terms "glitch window" and "susceptibility window" may be used interchangeably in this application.

The one or more computing systems 100 may also execute glitch window (GW) or susceptibility window (SW) module 124 that determines a glitch window of a circuit component (e.g., the circuit component of interest 104). More details about the determination of a glitch window are described below. With the glitch window of a victim circuit component and an initial set of aggressors, the one or more computing systems 100 may execute a grid construction module 114 to arrange the glitch window and the initial set of aggressors into a grid of events along a temporal axis. An event in the grid indicates a change in the state of a signal.

With the grid of events constructed, the one or more computing systems 100 may also execute a pruning module (122) that prunes a set of aggressors (or attackers) into a reduced or pruned subset of aggressor(s) by using the grid of events, based at least in part on a glitch window of a victim circuit component. The one or more computing systems 100 may also execute the pruning module (122) to select a smaller subset of aggressor(s) based at least in part on a glitch window of a victim circuit component.

A pruning module (122) may select one or more proper subsets of aggressors from a superset of aggressors based in part or in whole upon, for example, the glitch window of a victim in some embodiments. The one or more proper subsets of aggressors may be selected based in part or in whole upon, their respective significance of impact upon a victim. In some other embodiments, a pruning module (122) may prune (e.g., to remove from consideration) one or more aggressors or one or more subsets of aggressors from a proper superset of aggressors to reduce the total number of aggressors or the total number of subsets of aggressors for further analyses such as one or more timing analyses by a timing analysis or a delay calculation module (120) and/or one or more simulations (e.g., glitch simulation, etc.) by a simulation module (112). More details about the pruning action will be described below with reference to, for example, FIGS. 2A-2B.

The computing system may also include one or more modules in the set of modules 152. One or more modules in the set 152 may include or at least function in conjunction with a microprocessor 192 (e.g., a central processing unit or CPU) via a system bus 194 to access or invoke various modules in 152 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a data bus 196 to read and/or write data during the microprocessor's execution of processes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise, for example, a floorplanner, a global routing engine, and/or a detail routing engine 164, a layout editor 166, a design rule checker 168, a verification engine 170, etc.

These various resources 128 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design.

For example, these various resources 128 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

Strictly as an example, the one or more signoff modules may individually or in conjunction with one or more other modules (e.g., a timing analysis or a delay calculation module 120) perform one or more timing analyses and/or timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., FastSPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

Once sign-off and/or design closure is achieved, the electronic design is finalized for tapeout; and the electronic design is transmitted to mask fabrication equipment for mask preparation and mask writing to produce photomasks that are then used in the actual manufacturing of the electronic circuits represented by the electronic design.

The one or more computing systems 100 may further write to and read from a local or remote (e.g., networked storage device(s)) non-transitory computer accessible storage 162 that stores thereupon data or information such as, but not limited to, one or more databases (174) such as schematic design database(s) or physical design database(s), electronic circuit design specification database(s), techfiles for multiple design fabrics, various statistics, various data, rule decks, various design rules, constraints, etc. (172), or other pertinent information or data (176) that may be used to facilitate the performance of various functions described herein.

In some embodiments, the computing system 100 may include the various resources 128 such that these various resources may be invoked from within the computing system via a network or a computer bus 190 (e.g., an internet session, an intranet session, a data bus 196 interfacing a microprocessor 192 and the non-transitory computer accessible storage medium 198 (e.g., memory) or a system bus 194 between a microprocessor 192 and one or more engines or modules in the various resources 128). In some other embodiments, some or all of these various resources may be located remotely from the computing system 100 such that the computing system may access the some or all of these resources via a computer bus 190 and one or more network components.

In some embodiments, the computing system 100 may include the various resources 128 such that these various resources may be invoked from within the computing system via a system bus 194 (e.g., a data bus interfacing a microprocessor 192 and the non-transitory computer accessible storage medium 198 or a computer bus 190 between a microprocessor 192 and one or more engines in the various resources 128). In some other embodiments, some or all of these various resources may be located remotely from the computing system 100 such that a computing system 100 may access the some or all of these resources via a computer bus and/or one or more network components.

Each of various modules and engines described herein may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 100E for execution.

Figure 2A:
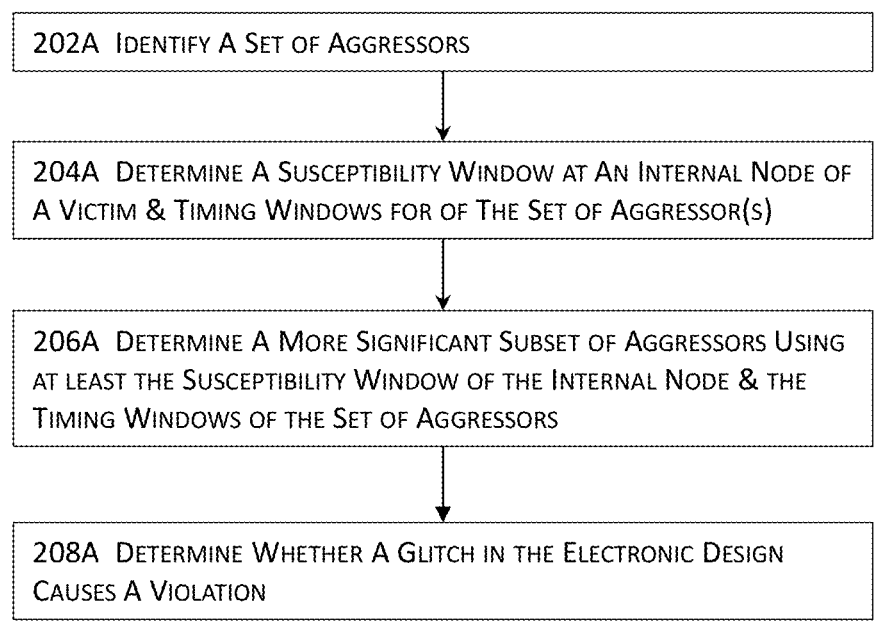
FIG. 2A illustrates a high-level flow diagram for characterizing an electronic design with a susceptibility window in one or more embodiments.

FIG. 2A illustrates a high-level flow diagram for characterizing an electronic design with a susceptibility window in one or more embodiments. In these one or more embodiments, a set of one or more aggressors may be identified at 202A. An aggressor may also be referred to as an attacker or an active circuit component that carries a noisy signal (e.g., a clock signal, a digital signal such as a digital select signal, etc.) A typical example of an aggressor includes a circuit component that switches states, and the switching causes capacitive crosstalk in a neighboring circuit component. In contrast, a victim or a passive circuit component having a voltage or current for reference. For example, a circuit component whose present state is to be maintained may be considered a victim.

With the set of one or more aggressors identified at 202A, a susceptibility window of or at an internal node of a victim may be determined at 204A. In addition, a timing window may be determined at 204A for each aggressor in the set of one or more aggressors identified at 202A. A timing window includes a temporal period during which transition (e.g., a transition to allow a flip-flop to latch) may occur. For example, a required time window, an arrival time window, or any other suitable time window at an input pin of an aggressor may be determined at 204A for an aggressor in the identified subset set of aggressors. A required time window (RTW) includes a temporal period during which a signal can arrival without making the corresponding clock cycle longer or shorter than desired or designed in some embodiments. An arrival time window includes a temporal period between the earliest possible time and the latest possible time at which a signal arrives at a certain point (e.g., an aggressor) in an electronic design.

A susceptibility window (or a glitch window) of a circuit component (e.g., a sequential circuit component) includes a temporal period during which the circuit component may be negatively affected if a glitch (e.g., capacitive crosstalk) from a neighboring circuit component (e.g., an aggressor). In these cases where a glitch arrives too early relative to a clock signal of a victim circuit component (e.g., before the clock signal shuts down the victim circuit component), the glitch may change the internal storage or the logic state of the victim circuit component. Nonetheless, the glitch may have sufficient time to recover as the glitch arrives too early. In these cases, the glitch may not cause any negative effect on the victim circuit component because the there is sufficient time for the glitch and hence the victim circuit component to recover due to the early arrival of the glitch.

In some other cases where the glitch resulting from, for example, capacitive crosstalk from an aggressor, arrives too late relative to the victim's clock signal. In these cases, the glitch may not have sufficient time to transition (e.g., to ramp up) to a state that causes negative effects (e.g., changing the internal storage) on the victim. For example, a glitch may not cause a negative effect on a victim circuit component when the glitch arrives after the clock signal shuts down the victim circuit component.

As demonstrated in the aforementioned two types of cases, whether a glitch causes a negative effect on a victim depends at least in part on when the glitch arrives relative to the victim. For example, an error occurs when a VL glitch (a glitch that transitions from 0 to 1 and then back to 0) or a VH glitch (a glitch that transitions from 1 to 0 and then back to 1) arrives at a time relative to a clock signal of a circuit component, and then the clock signal arrives to shut down the circuit component before the circuit component recovers so that the glitch changes the logic of the circuit component. Conventional approaches simply assume are a victim circuit component remains a victim yet fail to account for whether a glitch may cause a negative impact on the victim at all.

With the susceptibility window of an internal node and at least one timing window of a set of aggressors determined at 204A, a more significant subset (e.g., the strongest subset of aggressor(s) for a victim, a proper subset of aggressor(s) for a victim, etc.) of one or more aggressors on the internal node or the victim may be determined at 206A from the set of aggressors. In these embodiments, the susceptibility window of the internal node and/or the at least one timing window of an aggressor may be used as constraints for the determination of a proper subset of one or more aggressors that satisfies these constraints.

In some embodiments, a proper subset of one or more aggressors may be determined at 206A by pruning one or more aggressors that may exhibit less significant impact (or no impact at all) from the set of aggressors. In some other embodiments, one or more aggressors that may exhibit more significant impact (or any impact at all) may be determined from the superset of aggressors to form the proper subset of one or more aggressors at 206A. In some embodiments, the proper subset of one or more aggressors that may exhibit the most significant or strongest impact on the internal node or the victim may be identified at 206A.

With a proper subset of one or more aggressors determined at 206A, a determination may be made at 208A to determine whether a glitch (e.g., crosstalk noise) caused by the proper subset of one or more aggressors causes an error at the internal node of interest by performing one or more analyses such as a timing analysis, a delay calculation, a glitch analysis, etc. For example, the susceptibility window of the internal node and the at least one timing window of an aggressor may be arranged temporally to determine whether the aggressor's activity (e.g., switching) with respect to the at least one timing window may negatively affect the internal node based at least in part upon the relative relationship between the at least timing window and the susceptibility window arranged along the temporal axis. In some embodiments, a simulation module (112) or a timing analysis or a delay calculation module (120) may compute the glitch waveform (e.g., a simplified waveform such as a triangular waveform using the width and height of a glitch, a skewed triangular waveform, a more precise waveform from simulation, or any other suitable waveform) and may further optionally determine whether the glitch may be eliminated or ignored by a characteristic of the victim circuit component (e.g., a low-pass filtering characteristic of a CMOS or complementary metal-oxide-semiconductor logic gate).

The simulation or timing analysis or a delay calculation module may then determine how the glitch may be propagated to the output of the victim circuit component and determine how the glitch propagates, is amplified during propagation, and/or combines with downstream coupling so that the simulation or timing analysis or a delay calculation module may determine whether the glitch (or the amplified and/or combined glitch) may cause a negative effect on the internal node of an electronic design.

In addition to accounting for both an aggressor's timing window and a victim's susceptibility window, the simulation or timing module may further enhance the accuracy of its analyses by employing a receiver output peak model or a threshold model (e.g., a model expressing a glitch as a threshold percentage of supply voltage), rather than a receiver input peak model, that represents the response by the first stage in a driven cell to a glitch on the input pin to more accurately report significant glitches to avoid pessimistically reporting too many insignificant glitches.

A receiver output peak model models the response by, for example, the first stage of a CMOS to an incoming glitch and may thus be used to determine whether a glitch is sufficiently significant for further analysis. With the receiver output peak model, these embodiments judge whether a glitch is sufficiently significant based at least in part upon its actual effect on the receiving gate of the victim and more accurately and more reliably filter out less significant glitches. These embodiments not only filter out less significant glitch(es) but also account for both an aggressor's timing window and a victim's susceptibility to more accurately characterize the behaviors of an electronic design while conserving computing resource utilization. It shall be noted that some other embodiments may still employ the receiver input peak model or even the threshold model to predict a glitch and/or to more accurately filter out less significant glitch(es) or to report only more significant glitch(es).

Figure 2B:
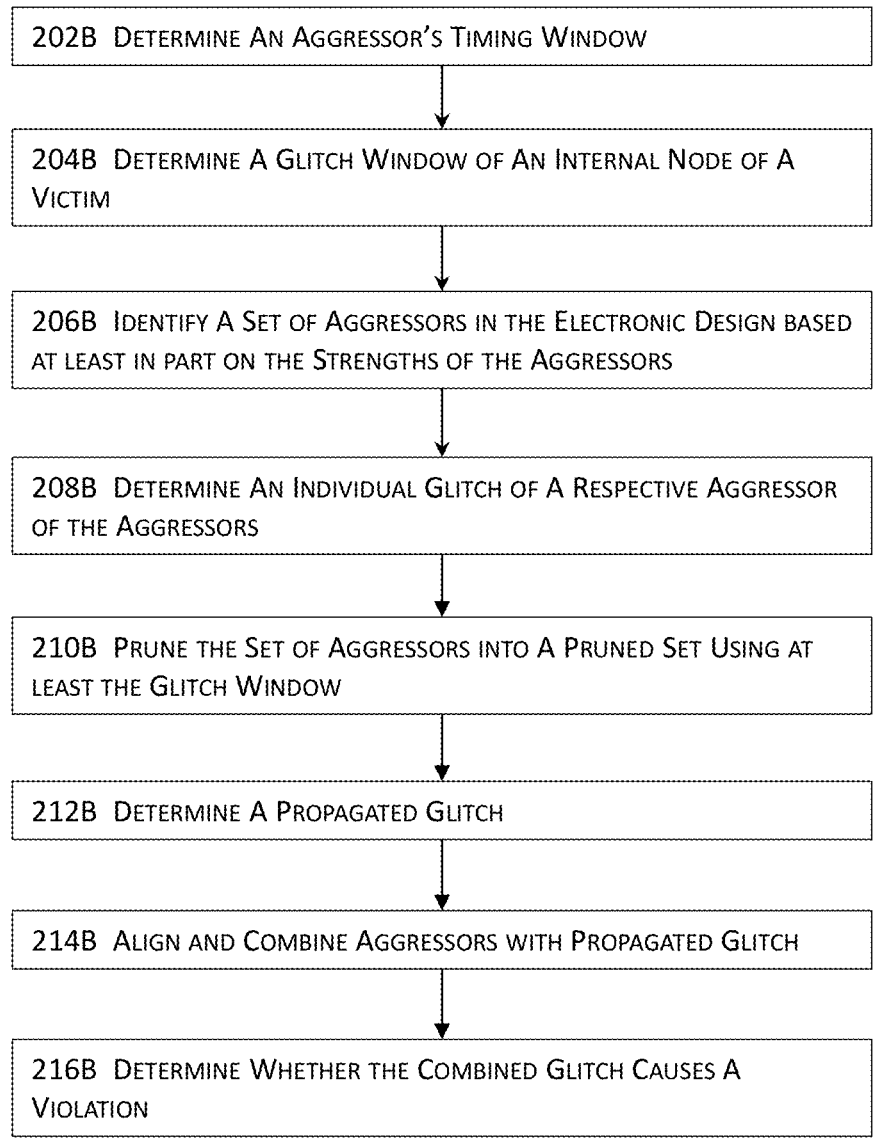
FIG. 2B illustrates more details about a high-level flow diagram for characterizing an electronic design with a susceptibility window in one or more embodiments.

FIG. 2B illustrates a more detailed flow diagram for characterizing an electronic design with a susceptibility window in one or more embodiments. In these embodiments, an aggressor's timing window may be first determined at 202B. For example, a timer module (110 in FIG. 1) may determine an aggressor's timing window by propagating the arrival times of a signal at an aggressor and using the earlier or earliest arrival time and the later or latest arrival time to form the timing window for the aggressor.

A susceptibility window (or glitch window) for an internal node of a victim circuit component may further be determined at 204B. In some embodiments, a susceptibility window for an internal node of a victim may be determined by determining an end-point susceptibility window at the end point (e.g., a flip-flop at the end of a net or net segment) of a net, a net segment, or a set of internal nodes along which the victim circuit component is located and further by propagating the end-point susceptibility window backward from the end point to the internal node by using a propagation speed bounding a glitch of an arbitrary shape. This determination of a susceptibility window by backward propagation is rigorously proven as provided below.

In some embodiments, a glitch is defined as a waveform $v(t)$, where $$v(t)=0, t<t_0 \quad (1)$$

$$v(t)>0, t>t_0 \quad (2)$$

$$v \to 0, \text{as } t \to \infty. \quad (3)$$

It shall be noted that various embodiments described herein use a VL type of glitches for the ease of illustration and description, although various techniques described herein apply with full and equal effects to a VH type of glitches as well.

Some embodiments further define a bounding property, denoted by the symbol ">", for glitches as follows: a first glitch $v_1(t)$ is to bound a second glitch $v_2(t)$ if $v_1(t) \geq v_1(t)$ for all t. Some embodiments may determine a required time window based at least in part upon one or more criteria including, for example, one or more pre-characterized timing constraints. These embodiments may determine a required time window at a D-pin of a flipflop from a clock definition and one or more constraints between the D-pin and the clock pin.

Some embodiments described herein are based at least in part upon the glitch monotonicity. One way to phrase the glitch monotonicity is that if two input glitches are in a bounding relationship, then the corresponding output glitches are also in a bounding relationship. That is, if output glitches $v_1$, and $v_1$ of a lumped stage are responses to two input glitches $w_1$ and $w_2$, respectively, and if $w_1 > w_2$, then $v_1 > v_2$. As described above, the symbol ">" denotes a bounding property. For example, a first glitch $v_1(t)$ is to bound a second glitch $v_2(t)$ (which may be expressed as $v_1 > v_2$) if $v_1(t) \geq v_1(t)$ for all t. Also, a lump stage may be defined as a lumped capacitor driven by a single-stage CMOS (complementary metal oxide semiconductor) gate. The inventors have rigorously proven the glitch monotonicity, and the rigorous mathematical proof is provided as follows.

Consider a model that represents a driver. For a glitch at an input and an output, forward Miller effect may be first ignored and subsequently justified. The equation Kirchhoff circuit law equation that governs the response may be expressed as equation (4) below.

$$C_{load} \frac{dV_0}{dt} = I(V_i, V_0) \quad (4)$$

The current source on the right-hand side of equation (4) includes two parts representing the holding stack, $I_{hold}(V_i, V_0)$, and the injecting stack, $I_{inj}(V_i)$ that is nearly independent of the output voltage because the opening (injecting current) stack is in the saturation regime for the magnitude of interest of glitches. For the VL glitch type (VH glitch type may be formulated similarly), the injecting current may be positive and the holding stack may be negative. The holding current may thus be represented as $I_{hold}(V_i, V_0) = -g(V_i, V_0) V_0$. Equation (4) may thus be rewritten as follows:

$$C_{load} \frac{dV_0}{dt} = I_{inj}(V_i) - g_i(V_i) g_0(V_0) v_0, \quad (5)$$

The injecting current may include a strong function of input voltage in some embodiments. Furthermore, for any bounding input glitch relationship, $w_1 > w_2$, the corresponding injecting currents may also be in a similar bounding relationship expressed in equation (6) below.

$$I_{inj}(w_1) > I_{inj}(w_2), \quad (6)$$

$g_i(V_i)$ may also be monotonically decrease with $V_1$, which also represents a "weakening effect". The holding admittance $g_0$ may also decrease with $V_0$ in some embodiments.

Subtracting equation (4) for two input glitches, $w_1$ and $w_1$, yields the following equation (7):

$$C_{load} \frac{d\delta}{dt} = I_{inj}(w_1) - I_{inj}(w_2) - g_i(w_1) g_0(v_1) v_1 + g_i(w_2) g_0(v_2)(v_2), \quad (7)$$

The difference between output glitches $\delta = w_1 - w_2$ may thus be determined. The next steps involve proving that $\delta$ is also a glitch. That is, the next section is to prove $\delta(t) > 0$ and hence $v_1 > v_2$ for all t.

Equation (7) may first be rewritten into the following form expressed in equation (8).

$$C_{load} \frac{d\delta}{dt} = \Delta + g_i(w_2) g_0(v_2) \delta, \quad (8)$$

$\Delta$ may be defined as $\Delta = I_{inj}(w_2) - I_{inj}(w_i) - g_i(w_1) g_0(v_1) v_1 + g_i(w_2) g_0(w_2) v_2$. Based on equation (6) above, a conclusion may be reached that $\Delta > 0$ for all t because $g_i$ and $g_0$ are decreasing functions.

In addition, the solution of equation (8) has the following form:

$$\delta = e^{\frac{-\int g dt}{C_{load}}} \int_0^t e^{\frac{-\int g dt''}{C_{load}}} \Delta dt', \quad (9)$$

In equation (9) above, $g = g_i g_0$. Furthermore, the solution of equation (8) as indicated in equation (9) is positive at all times because $\Delta > 0$, $g_0 > 0$, and $g_i > 0$. The aforementioned section proves the glitch monotonicity—if the input glitches are in a bounding relationship, the corresponding output glitches are also in a bounding relationship.

The following describe a simplified example application of the aforementioned glitch monotonicity. Assuming a first glitch is as high as $V_{DD}$ and is constructed by two transitions—the rising transition and the falling transition that trailing the rising transition. If this first glitch that propagates at a certain speed bounds a second glitch at a given stage, this first glitch will bound the propagated second glitch at all stages downstream. As a result, the determination of a susceptibility window for an internal node in a net or a net segment of an electronic design may thus be determined by first determining an end-point susceptibility window at an end point (e.g., a flip-flop at the end of a net or net segment) and further by propagating the end-point susceptibility window backwards to the internal point of interest.

Referring back to FIG. 2B, a set of aggressors may be identified at 206B based at least in part upon the respective strengths of the aggressors in the set in some embodiments. An aggressor represents a circuit component whose signal transitions may cause capacitive crosstalk in a neighboring circuit component (a victim) within some close proximity of the aggressor. In these embodiments, an aggressor may be identified at 206B into the set based at least in part upon a range of influence that may be determined as a function of the strength of the aggressor. More complex algorithms may also be used to identify the set of aggressors at 206B although it shall be noted that a conservative approach may be adopted at 206B in the identification of the set of aggressors because this identified set of aggressors may be further subject to subsequent, more accurate pruning or filtering (e.g., at 210B described below).

For each aggressor in the set of aggressors identified at 206B, a glitch may be determined at 208B. A glitch may be determined based at least in part upon, for example, holding admittance (e.g., the inverse of impedance of a circuit component when the data is stable after an active clock edge) of a driver or a driving gate (whose driving power may be weakened by an input glitch) through an individual glitch simulation with a simulation module (e.g., 112 in FIG. 1). For example, the glitch waveform, the significance of the glitch, etc. may be determined via a simulation module (e.g., 112 in FIG. 1) that performs one or more glitch simulations. A receiver output peak model, a receiver input peak model, a threshold model, or any other suitable model(s) may also be employed in determining a glitch for an aggressor in the set of aggressors at 208B. In some embodiments, A subset of aggressor(s) such as a more significant subset (e.g., a stronger or the strongest subset) having one or more aggressors may be determined at 210B from the set of aggressors based at least in part upon the individual glitch of an aggressor determined at 208B. In some embodiments, a subset of one or more aggressors may be determined at 210B based at least in part upon the relationship between the one or more respective timing windows of the one or more aggressors and/or one or more combinations thereof. More details about determining a subset of one or more aggressors are described below with reference to FIGS. 3A-3H.

In addition to the holding admittance, an individual glitch of an aggressor may be further determined based further in part or in whole upon logical correlation and overlapping aggressor timing windows. For example, a subset of one or more aggressors may be identified at 210B from the set of aggressors identified at 206B in some embodiments. In some other embodiments, one or more subsets of aggressors may be filtered out at 210B from the set of aggressors identified at 206B so that the remaining one or more aggressors form the subset of one or more aggressors. In some uncommon embodiments where the set of aggressors identified at 206B is the more significant set of aggressors (e.g., the strongest set of aggressors), the set of aggressors identified at 206B is thus determined to be the subset of one or more aggressors at 210B.

With the more significant subset determined at 210B, a propagated glitch may be determined at 212B. In some embodiments, a propagated glitch may be determined by, for example, simulating the driver with an input glitch while keeping one or more aggressor(s) quiet (e.g., non-switching). At 214B, the respective individual glitch for each aggressor in the more significant subset may then be combined and aligned temporally into a combined glitch. In some of these embodiments, the one or more respective individual glitches of the one or more aggressors in the more significant subset may be aligned temporally in a worse or worst possible way for a victim of interest. One or more analyses may then be performed at 216B to determine whether the combined glitch causes a violation on the victim.

Figure 2C:
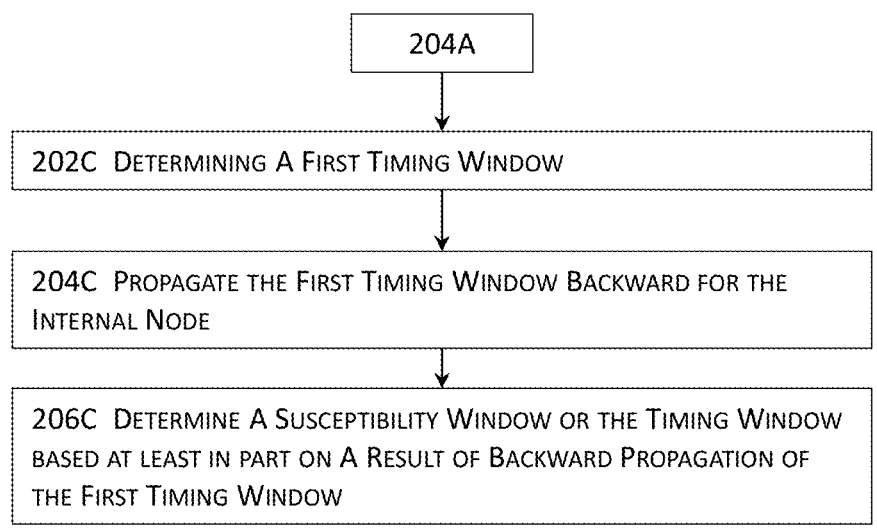
FIG. 2C illustrates more details about a portion of the high-level flow diagram illustrated in FIG. 2A in one or more embodiments.

FIG. 2C illustrates more details about a portion of the high-level flow diagram illustrated in FIG. 2A in one or more embodiments. More specifically, FIG. 2C illustrates more details about determining a susceptibility window of a victim and a timing window of an aggressor at 204A of FIG. 2A and/or 204B of FIG. 2B. One of the objectives of the flow illustrated in FIG. 2C is to determine a susceptibility window of a victim and/or a timing window of an aggressor. In these embodiments, a timing window may be determined at a location along a net or a net segment at 202C. For example, a first required time window may be determined for an aggressor at 202C; and/or a second required time window may be determined for a victim at 202C.

Nonetheless, it shall be noted that an aggressor or a victim may be located anywhere along a net or a net segment. Therefore, some embodiments first determine a first timing window at a location along a net or a net segment along which an aggressor is located at 202C in order to determine a timing window for the aggressor for the victim of interest. Similarly, a susceptibility window at a location along a net or a net segment along which a victim is located at 202C to determine a susceptibility window for the victim which may be located anywhere along the net or net segment.

In some embodiments, the location at which the first timing window is determined at 202C includes the location of an end point of the net or the net segment. In some other embodiments, the location at which the first timing window is determined at 202C includes the location of any node or nodal point between an end point of the net or the net segment and the internal node of interest.

It shall be noted that although various embodiments or examples described herein refer to an end point of a net or a net segment, these various embodiments or examples achieve entirely identical or substantially similar effects for any point along the net or net segment between the end point and the internal node of interest. As a result, references to an end point of a net or a net segment are merely described strictly for the ease of description or illustration, rather than in a limiting sense to limit the respective scopes of these various examples or embodiments.

Many suitable timing windows may be determined as the first timing window at 202C. For example, one or more of a required time window, an arrival time window, etc. may be determined at 202C for the end point of the net or net segment. A required time window includes a temporal period between a first required time for signal rising and a second required time for signal falling relative to an active clock signal so that a signal (e.g., an input data signal) may arrive without making the clock cycle any longer than desired or designed and without waiting for the next active clock cycle. An arrival time includes the time elapsed (and hence the earliest possible time and the latest possible time at which a signal may change) for a signal to arrive at the end point (e.g., the input pin or D-pin of the circuit component)

may be determined by delay calculation of the circuit components along the net or net segments including the aggressor.

In order to determine the timing window for an internal node that is not located at an end point of a net or a net segment, the first timing window determined at 202C may be propagated backwards from the end point to the internal node of interest along the net or net segment. The legality of backward propagation of a timing window described herein has been proven above with reference to the glitch monotonicity. In some embodiments where an aggressor is located at an end point of a net or net segment, the first timing window (e.g., a required time window) determined at 202C may be used as the timing window for the circuit component of interest (e.g., an aggressor, a victim, etc.)

In some of these embodiments where the circuit component of interest (e.g., an aggressor, a victim, etc.) is not located at an end point of the net or net segment, the timing window may be determined by first determining an end timing window at an end point of the net or net segment at 202C as the first timing window and further by propagating the end timing window (the first timing window) backwards from the end point to the circuit component of interest at 204C. For example, a timer module (e.g., 110 in FIG. 1) may traverse the net or net segment backwards from the end point and consecutively subtract delays from both edges (e.g., the rising edge and the falling edge) of the end point timing window to derive the timing window for an aggressor (or a victim) that is not located at the end point of the net or net segment at 204C. With the timing window determined for the circuit component of interest at 204C, these embodiments further determine a susceptibility window for a victim at 206C. More details about the determination of a susceptibility window are described below with reference to FIG. 2D. Again, it shall be noted that although various embodiments or examples described herein refer to an end point of a net or a net segment, these various embodiments or examples achieve entirely identical or substantially similar effects for any point along the net or net segment between the end point and the internal node of interest. As a result, references to an end point of a net or a net segment are merely described strictly for the ease of description or illustration, rather than in a limiting sense to limit the respective scopes of these various examples or embodiments.

Figure 2D:
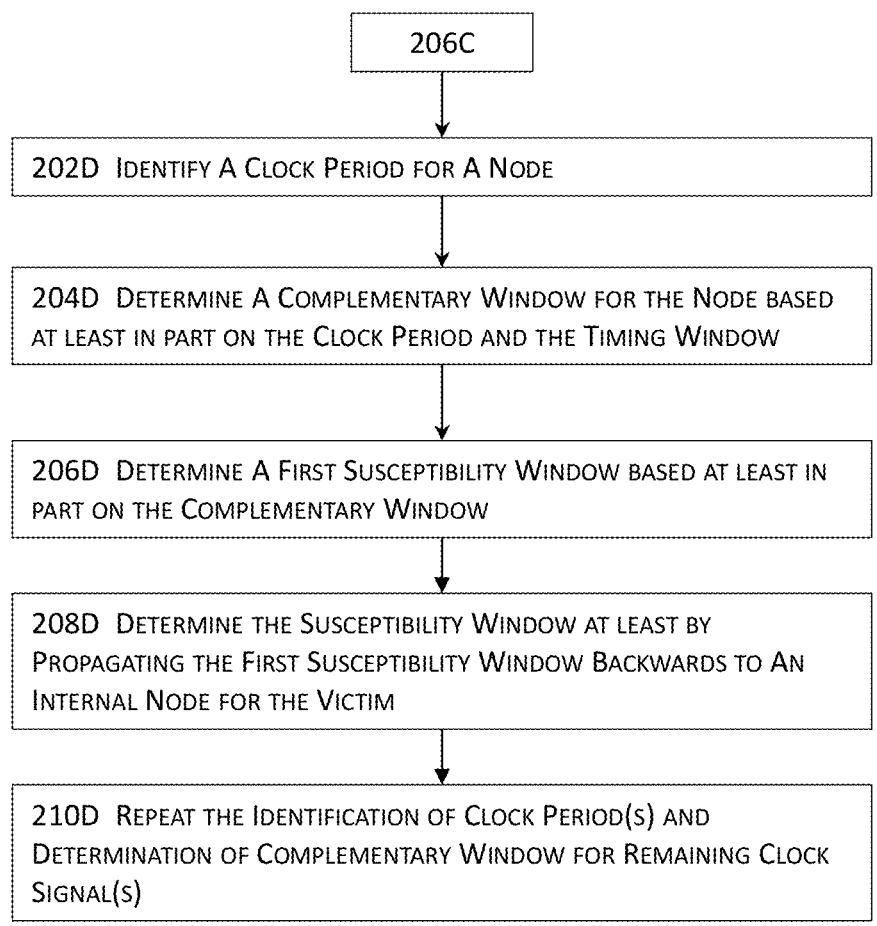
FIG. 2D illustrates more details about a portion of the flow diagram illustrated in FIG. 2C in one or more embodiments.

FIG. 2D illustrates more details about a portion of the flow diagram illustrated in FIG. 2C in one or more embodiments. More specifically, FIG. 2D illustrates more details about determining a susceptibility window for a victim at 206C of FIG. 2C. As described above, a susceptibility window or a glitch window may be defined a node along a net or net segment (e.g., a data-path net or net segment) or to include a timing window during which a glitch, when occurs, may propagate into a sequential element and cause an incorrect value or state in the sequential element. The determination of a susceptibility window of a victim is substantially similar to the determination of a timing window for a circuit component of interest in that both determinations may be based at least in part upon the glitch monotonicity theorem proven above. On the other hand, a determination of a susceptibility window of a victim is nevertheless vastly different from the determination of a timing window of an aggressor as described further below.

Like an aggressor, a victim may be located anywhere along a net or a net segment. The following description of FIG. 2D describes a general approach for embodiments where a victim is not located at an end point of a net or net segment. In some other embodiments where a victim is located at the end point of a net or net segment, the process flow illustrated in FIG. 2D and described below may be simplified by omitting, for example, the backward propagation (208D).

A clock cycle having a clock period may be first identified at 202D for a node that is located at the end point of a net or net segment along which the victim is located. With the clock cycle and clock period identified at 202D, a complementary window may be determined at 204D for the node based at least in part upon the clock period and a timing window for the end point determined at FIG. 2C described above. In some embodiments, a complementary window may be determined by subtracting the timing window from the clock period for the clock cycle. A complementary window may be defined in several different ways based at least in part upon, for example, the aggressiveness or conservatism of subsequent analyses. More details about the determination of a complementary window are described below with reference to FIGS. 3A-3H.

A susceptibility window for a victim may be determined at 206D based at least in part upon the complementary window determined at 204D or the clock period identified at 202D. Like the complementary window of a node that may be determined in several different manners, a susceptibility window may also be determined based in whole or in part on the complementary window in many different ways. For example, a susceptibility window may be determined as the entire clock period of the victim in some embodiments. In some other embodiments, a susceptibility window may be determined as the entire complementary window. Yet in some other embodiments, a susceptibility window may be determined as a proper subset of the complementary window. More details about the determination of a susceptibility window are described below with reference to FIGS. 3A-3H.

In some embodiments where the victim is located at the end point of a net or net segment, the susceptibility window determined at 206D may be used as the susceptibility window for the victim. In some other embodiments where the victim is not located at the end point of a net or net segment, the susceptibility window determined at 206D may be propagated backwards at 208D form the end point to an internal node with which the victim is associated.

The backward propagation for a susceptibility window may be done in a substantially similar manner as that for a timing window described above. For example, a timer module (e.g., 110 in FIG. 1) may traverse the net or net segment backwards from the end point and consecutively subtract delays from the susceptibility window determined at 206D for the end point until reaching the internal node of interest based on the glitch monotonicity theorem proven above. The process may then repeat the subprocesses 202D through 208D for one or more remaining clock signals at 210D.

Figure 2E:
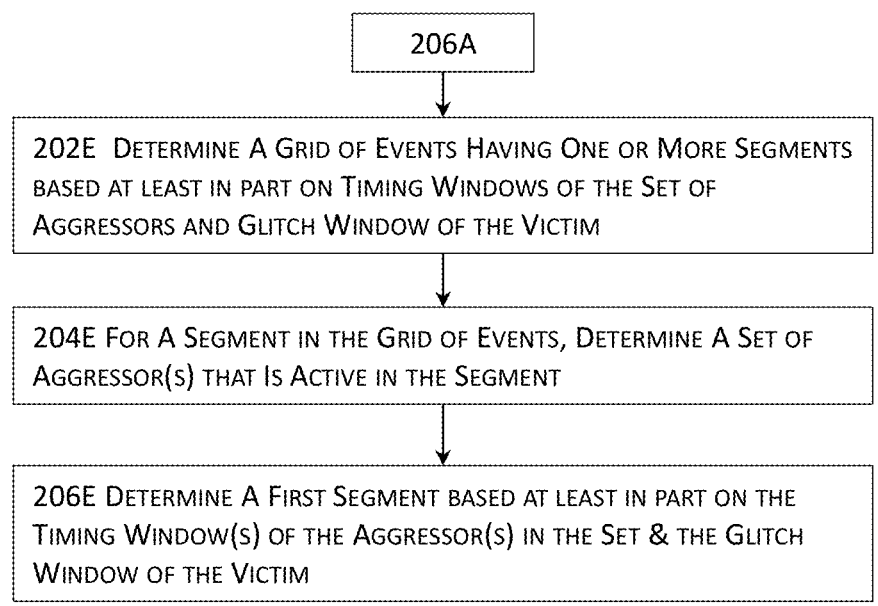
FIG. 2E illustrates more details about a portion of the high-level flow diagram illustrated in FIG. 2A in one or more embodiments.

FIG. 2E illustrates more details about a portion of the high-level flow diagram illustrated in FIG. 2A in one or more embodiments. More specifically, FIG. 2E illustrates more details about determining a more significant subset of one or more aggressors at 206A from a plurality of aggressors illustrated in FIG. 2A and described above. In these embodiments illustrated in FIG. 2E, a grid of events may be determined at 202E based at least in part upon the timing window determined for an aggressor and a susceptibility window of a victim determined at 204A. Moreover, a set of one or more aggressors that is active in a segment may be determined at 204E for the segment in the grid of events.

With the set of one or more aggressors determined at 204E, a first segment may be determined at 206E based at least in part upon a timing window of the set of one or more aggressors and the glitch window of the victim.

A grid of events comprises one or more segments in the temporal dimension where a segment in a one-dimensional space comprises two end points, and each end point corresponds to an end of at least one window or temporal period (e.g., a required time window, a susceptibility window, setup time, hold time, etc.) It shall be noted that the two ends of a segment may or may not correspond to the same window or temporal period. For example, one end of a segment may correspond a first window or temporal period (e.g., a required time window of a first circuit component) whereas the other end of the segment may correspond to a second window or temporal period (e.g., a required time window of a second circuit component). More details and examples of a grid of segments are described below with reference to FIG. 3E.

Figure 3A:
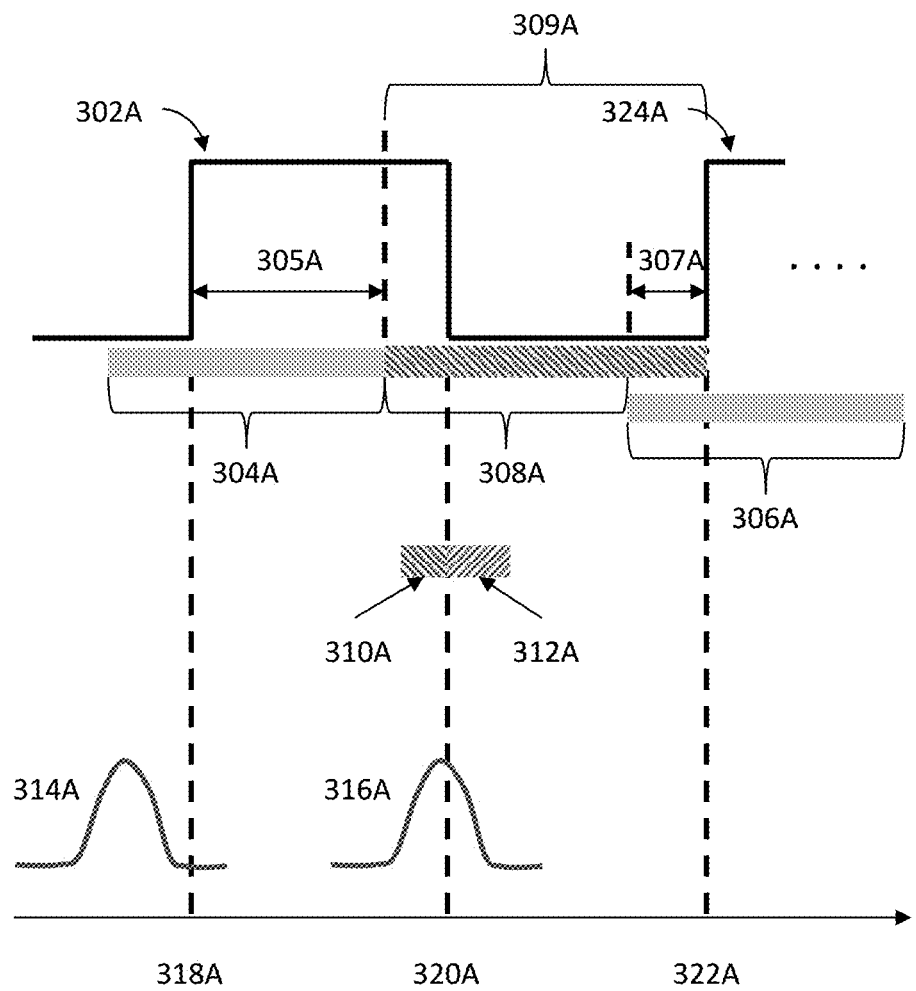
FIG. 3A illustrates an example schematic of a simplified electronic design in one or more embodiments.

FIG. 3A illustrates an example schematic of a simplified electronic design in one or more embodiments. More specifically, FIG. 3A describes a simplified example delineating relationships among an example timing window, an example complementary window, an example susceptibility window. In this example, a simplified clock signal (e.g., a clock signal of an aggressor) having a first clock cycle 302A and a second clock cycle 324A for a victim where the first clock cycle 302A corresponds to a first required time window 304A of an aggressor, and the second clock cycle 324A corresponds to the second required time window 306A of the same or a different aggressor. It shall be noted that the example illustrated in FIG. 3A and described herein refers to required time windows for the sole purpose and ease of illustration and description, and that other timing windows may also be used to achieve identical or substantially similar purposes and are thus also contemplated as a part of the description.

The three vertical dashed lines (318A, 320A, and 322A) in FIG. 3A respective represent edges of the first and the second clock cycles. For example, dashed line 318A corresponds to the rising edge of the first clock cycle 302A; dashed line 320A corresponds to the falling edge of the first clock cycle 302A; and dashed line 322A corresponds to the rising edge of the second clock cycle 324A. The time period defined by two consecutive rising edges (e.g., 318A and 322A) represents the clock period.

A complementary window of the victim may be determined by subtracting at least a portion of a required time window 304A within the first clock cycle of interest 302A from the clock period while 306A represents the required time window for the second clock cycle 324A. For example, a complementary window for the clock cycle 302A may be determined by subtracting a portion (e.g., 305A) of the required window 304A in the clock cycle 302A from the clock period as illustrated by 308A. A susceptibility window for a victim may be determined based at least in part on the corresponding complementary window. As described above, a susceptibility window may be the entire complementary window (309A) that is determined by subtracting the portion of the required time window (305A) from the clock period between 318A and 322A in some embodiments.

A susceptibility window may also be a smaller portion of the complementary window 309A in some other embodiments. For example, a susceptibility window may be determined as the temporal period that is determined by subtracting the portion 307A of the second clock cycle 324A from the complementary window 309A in some embodiments. As another example, a susceptibility window of a victim may be determined as the portion of the complementary window 309A to include the temporal period of the setup time (e.g., 310A) and the hold time (e.g., 312A) of the victim. As yet another example, a susceptibility window of a victim may be determined to be a smaller portion of the complementary window 309A, and the location and size of the smaller portion may also be determined in several different ways so long as the smaller portion is fully enclosed by the complementary window.

The example illustrated in FIG. 3A further demonstrates the same glitch (in terms of magnitude, waveform, etc.) may or may not necessarily cause a negative effect on a victim. For example, a VL glitch 314A has sufficient time to ramp up to a voltage level for the first clock cycle 302A to flip the internal storage of the victim because the glitch 314A arrives within the required time window 304A of the first clock cycle 302A. Nonetheless, the glitch 314A arrives sufficiently early before the susceptibility window of the victim opens during the first clock cycle 302A. Therefore, the VL glitch 314A may thus recover (e.g., ramping down to zero) so that the victim may also recover. In this example, the VL glitch 314A may be determined not to cause a negative effect on the victim.

On the other hand, the VL glitch 316A arrives later than the VL glitch 314A. Moreover, the VL glitch 316A arrives when the susceptibility window (e.g., 310A plus 312A) is open and has sufficient time to ramp to a voltage value to cause negative effects yet the clock signal 302A shuts down the victim before the VL glitch 316A recovers. In this example, the VL glitch 316A changes the internal storage or logic of the victim, but the victim is unable to recover because the falling edge 320A of the first clock signal 302A shuts down the victim. As a result, the VL glitch 316A, unlike the VL glitch 314A, may cause a negative effect (e.g., an error) in the victim.

This example illustrated in FIG. 3A further demonstrates the shortcomings of conventional approaches merely assume all glitches of sufficient strength(s) may cause errors and thus need to be analyzed yet fail to account for when a glitch arrives at a victim circuit component in conventional analyses. Such conventional approaches thus waste unnecessary computing resources in analyzing some glitches that do not even pose a risk of negatively affecting a victim. One of the advantages of various embodiments described herein is that various embodiments not only consider aggressors and aggressor strengths but also a victim's susceptibility to glitches caused by the aggressors to provide at least equally accurate results while conserving much computing resources at least by accounting for a victim's susceptibility to the influence by one or more aggressors in the form of a susceptibility window or glitch window.

Figure 3B:
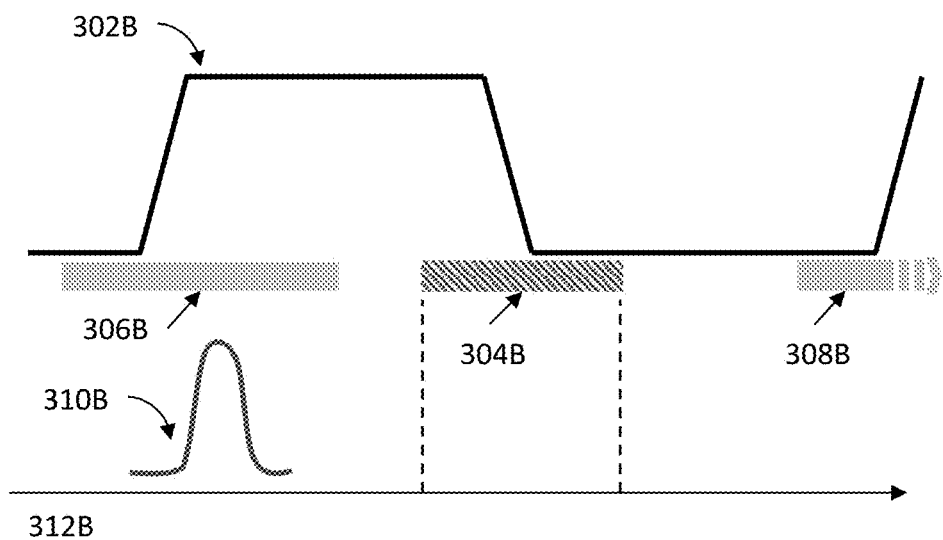
FIG. 3B illustrates a simplified example of a glitch that arrives too early to cause damages to a sequential element.

FIG. 3B illustrates a simplified example of a glitch that arrives too early to cause damages to a sequential element. This example illustrated in FIG. 3B demonstrates a case where a glitch 310B arrives too early at a victim and may thus be discarded from further analyses. In FIG. 3B, a clock cycle 302B of a victim corresponds to a first timing window 306B, and the next clock cycle corresponds to a second timing window 308B along a temporal axis 312B.

A susceptibility window 304B may be determined for the clock cycle 302B as shown in FIG. 3B for the victim by using one of the techniques described herein. As illustrated in FIG. 3B, the glitch 310B (a VL glitch) caused by, for example, an aggressor's switching arrives within the timing window 306B of the clock cycle 302B and has sufficient time to ramp up to a voltage level that is assumed to be sufficient to cause a negative effect on the victim.

Nonetheless, the glitch 310B arrives sufficiently early so that the glitch 310B recovers (e.g., ramping down to zero) before the susceptibility window 304B opens. In this example, the glitch and hence the victim may thus recover before the clock signal 302B shuts down the victim. In this case, the glitch 310B may be determined not to cause a negative effect on the victim and may thus be excluded from further analyses due to the temporal relationship between the glitch 310G (or the corresponding aggressor's timing window during which switching and thus the glitch 310B occurs) and the susceptibility window 304B of the victim.

Figure 3C:
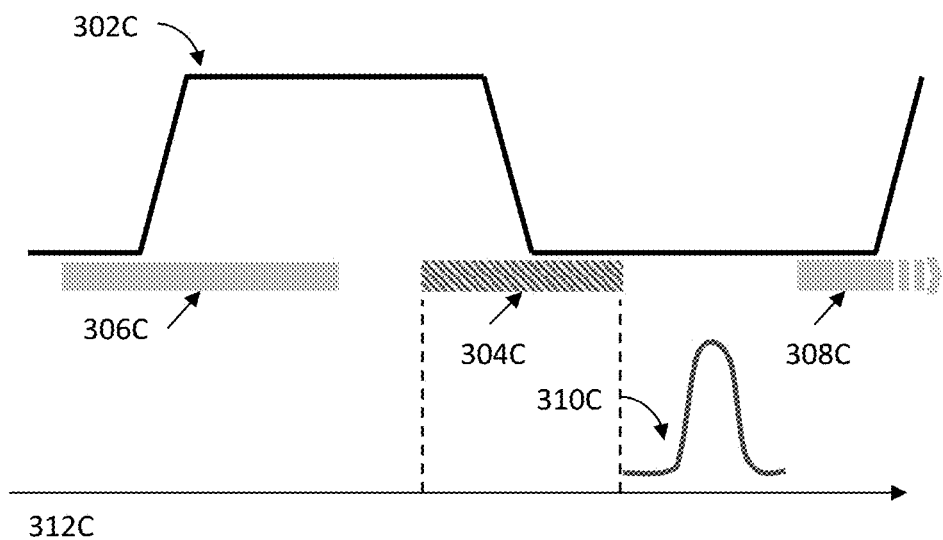
FIG. 3C illustrates a simplified example of a glitch that arrives too late to cause damages to a sequential element.

FIG. 3C illustrates a simplified example of a glitch that arrives too late to cause damages to a sequential element. This example illustrated in FIG. 3C demonstrates a case where a glitch 310C arrives too late at a victim and may thus be discarded from further analyses. In FIG. 3C, a clock cycle 302C of a victim corresponds to a first timing window 306C, and the next clock cycle corresponds to a second timing window 308C along a temporal axis 312C.

A susceptibility window 304C may be determined for the clock cycle 302C as shown in FIG. 3C for the victim by using one of the techniques described herein. As illustrated in FIG. 3C, the glitch 310C (a VL glitch in this example) caused by, for example, an aggressor's switching arrives after the susceptibility window 304C of the clock cycle 302C is closed (and before the timing window 308C of the next clock cycle opens).

That is, the glitch 310C arrives sufficiently late so that the glitch 310C may be determined not to cause a negative effect on the victim because the clock signal shuts down the victim for the clock cycle 302C and may thus be excluded from further analyses due to the temporal relationship between the glitch 310C (or the corresponding aggressor's timing window during which switching and thus the glitch 310C occurs) and the susceptibility window 304C of the victim.

Figure 3D:
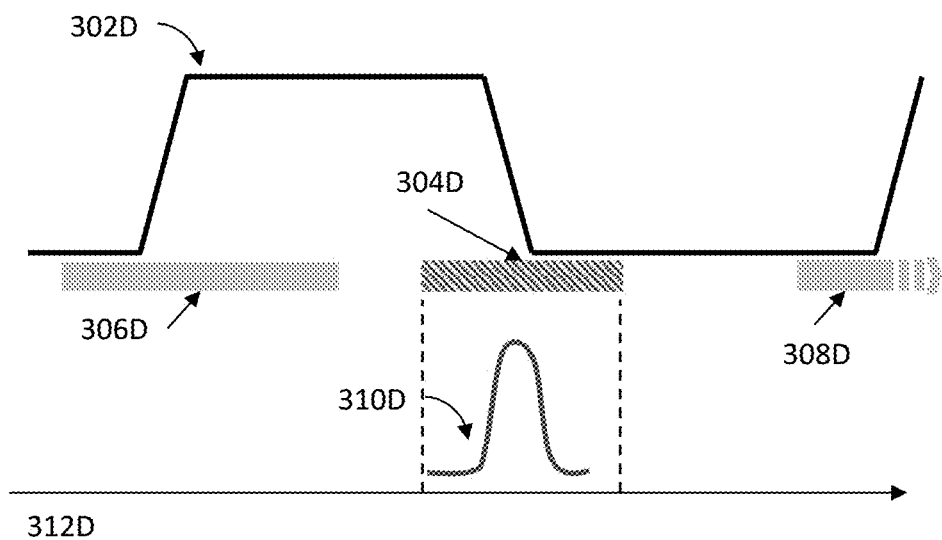
FIG. 3D illustrates a simplified example of a glitch that arrives neither too late nor too late and thus causes damages to a sequential element.

FIG. 3D illustrates a simplified example of a glitch that arrives neither too late nor too late and thus causes damages to a sequential element. This example illustrated in FIG. 3D demonstrates a case where a glitch 310D arrives within the susceptibility window 304D of a victim. The glitch 310D has sufficient time to ramp up to a voltage level that may be assumed to cause a negative effect on the victim. In FIG. 3D, a clock cycle 302D of a victim corresponds to a first timing window 306D, and the next clock cycle corresponds to a second timing window 308D along a temporal axis 312D.

A susceptibility window 304D may be determined for the clock cycle 302D as shown in FIG. 3D for the victim by using one of the techniques described herein. As illustrated in FIG. 3D, the glitch 310D (a VL glitch) caused by, for example, an aggressor's switching arrives within the susceptibility window 306D of the clock cycle 302D and has sufficient time to ramp up to a voltage level that is assumed to be sufficient to cause a negative effect on the victim.

Furthermore, the glitch 310D arrives sufficiently early before the clock signal shuts down the victim during the clock cycle 302D. If the clock signal shuts down the victim during the clock cycle 302D so that the glitch 310D and hence the victim does not have sufficient time to recover (e.g., ramping down to zero), the glitch 310D may thus changes the internal storage or logic of the victim to cause an error. In this example, the glitch 310D may be determined to cause a negative effect on the victim and may thus be included in further analyses due to the temporal relationship between the glitch 310D (or the corresponding aggressor's timing window during which switching and thus the glitch 310D occurs) and the susceptibility window 304D of the victim.

Figure 3E:
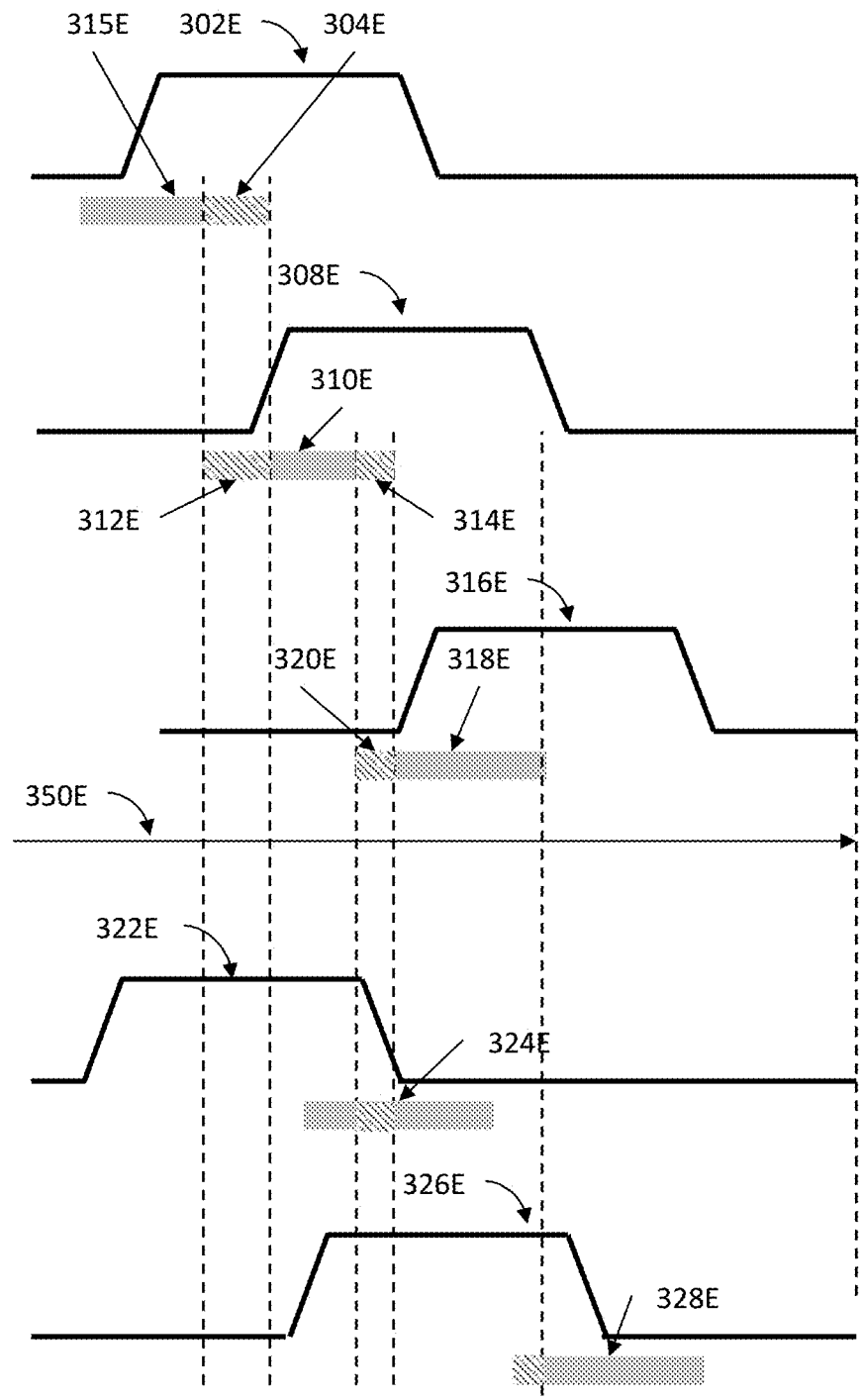
FIG. 3E illustrates a simplified example having multiple aggressors whose switching may cause undesired effects in two separate victims to demonstrate an example selection of a subset of aggressor(s) with respect to a victim in one or more embodiments.

FIG. 3E illustrates a simplified example having multiple aggressors whose switching may cause undesired effects in two separate victims to demonstrate an example selection of a subset of aggressor(s) with respect to a victim in one or more embodiments.

This example illustrated in FIG. 3E includes a first aggressor clock cycle 302E of a first aggressor, a second aggressor clock cycle 308E of a second aggressor, and a third aggressor clock cycle 316E of a third aggressor. The first aggressor clock cycle 302E corresponds to a first timing window (e.g., a first required time window 315E plus 304E); the second aggressor clock cycle 308E corresponds to a second timing window (e.g., a second required time window 312E plus 310E and 314E); and the third aggressor clock cycle 316E corresponds to a third timing window (e.g., a third required time window 320E plus 318E). These three aggressor clock cycles (302E, 308E, and 316E) have been arranged temporally along the temporal axis 350E.

This example in FIG. 3E also includes a first victim clock cycle 322E that corresponds to a first susceptibility window 324E for a first victim circuit component as well as a second victim clock cycle 326E that corresponds to a second susceptibility window 328E for a second victim circuit component. The first and the second victim clock cycles are also temporally arranged with respect to the first, the second, and the third aggressor clock cycles (302E, 308E, and 316E) to demonstrate their temporal relationships along the temporal axis 350E.

Regarding the first victim having the victim clock cycle 322E and the first susceptibility window 324E, some embodiments first generate or update a grid of events by, for example, locating the time points of one or more timing windows and susceptibility windows along the temporal axis 350E. Locating these time points thus creates a plurality of segments as described above with reference to FIG. 2E. To determine a more significant subset of one or more aggressors, some embodiments account for not only the respective strengths of the three aggressors but also the respective timing windows (e.g., required time windows of the three aggressors) as well as the susceptibility window 324E of the first victim.

Strictly as an example, the respective strengths of the three aggressors may be assumed to have the second aggressor (corresponding to the clock cycle 308E) has the strongest strength, the first aggressor (corresponding to the clock cycle 302E) has the intermediate strength, and the third aggressor (corresponding to the clock cycle 316E) has the weakest strength.

In this example illustrated in FIG. 3E, conventional approaches may simply select at least the second aggressor due to its strongest strength in causing capacitive crosstalk noise. In some cases where at least one aggressor is to be filtered out, conventional approaches may simply filter out the third aggressor due to its weakest strength. Nonetheless, various embodiments described herein do not take on such an overly simplistic approach. Rather, various embodiments described herein account for not only the aggressor(s) but also a victim circuit component. More specifically, some embodiments identify a plurality of aggressors for a victim and select a more significant subset of one or more aggressors for the victim as described above with reference to FIGS. 2A and 2E.

The example illustrated in FIG. 3E demonstrates the determination of a more significant set of aggressor(s) from the three aggressors (corresponding to clock cycles 302E, 308E, and 316E) for each of the two victims (corresponding to clock cycles 322E and 326E). For the first victim having the first victim clock cycle 322E and the first susceptibility window 324E, some embodiments determine a grid of events having the clock cycles of the three aggressors, the first victim clock cycle, and the first susceptibility window 324E temporally and determine a plurality of segments.

As described above, a segment in a one-dimensional space comprises two end points, and each end point corresponds to an end of at least one window or temporal period (e.g., a required time window, a susceptibility window, setup time, hold time, etc.) In the example illustrated in FIG. 3E, a segment may be determined by projecting the end points of the time periods and/or time windows onto a one-dimensional axis. A segment may also be defined in a two-dimensional space to include a vertical strip bounded by the projection lines of the two end points of one or more time periods and/or one or more time windows. In the example illustrated in FIG. 3E, a segment may be defined by two immediately adjacent dashed lines in FIG. 3E. It shall be noted that a one-dimensional grid of events (e.g., by projecting end points of time periods and/or time windows onto a straight line such as a temporal axis) may be more effective in terms of computing resource consumption, whereas a two-dimensional grid, when presented to a user, is more user-friendly as a user may easily understand what each segment corresponds to.

With the grid of events determined, some embodiments may determine a set of more significant aggressor(s) for the first victim corresponding to the first susceptibility window 324E. When two or more aggressors' timing windows (e.g., required time windows) overlap within a temporal period, the capacitive crosstalk noise may be amplified because these two or more aggressors may switch within the overlapping temporal period. In this example illustrated in FIG. 3E, the first aggressor timing window 315E overlaps the second aggressor timing window in the segment 312E for the second aggressor timing window (or segment 314E in the first aggressor timing window). Also, the second aggressor timing window overlaps the third aggressor timing window in the segment 314E for the second aggressor timing window (or segment 320E in the third aggressor timing window).

To select a more significant subset of aggressor(s), some embodiments select the subset comprising the second and the third aggressors by accounting for the first susceptibility window 324E of the first victim, although the first aggressor (corresponding to 302E) has a stronger strength than the third aggressor (corresponding to 316E), the timing window. These embodiments are aware of the second strongest strength of the first aggressor.

Nonetheless, the overlapping temporal period (304E for the first aggressor or 312E for the second aggressor) is outside of the first susceptibility window 324E. That is, when the first susceptibility window 324E is determined as shown in FIG. 3E (although it may be determined in many different ways), some embodiments select the second and the third aggressors into a more significant set of aggressors, while the first aggressor (corresponding to the timing window 315E) is not selected. That is, these embodiments select the third strongest third aggressor over the second stronger first aggressor after accounting for the first victim.

It shall be noted that some other embodiments may select a more significant set that includes, for example, only the second aggressor based at least in part upon its strongest strength. Some other embodiments may select all three aggressors based at least in part upon, for example, a threshold limit of the strength of an aggressor beyond which the aggressor will be selected, although the latter selection will consume more computational resources.

To select a more significant subset of for the second victim corresponding to the second victim clock cycle 326E, some embodiments may reference the grid of events described above and determine that neither the second aggressor's timing window (the strongest aggressor among the three aggressors) nor the first aggressor's timing window (the second strongest among the three aggressors) overlaps the susceptibility window 328E of the second victim. These embodiments may thus select the third aggressor corresponding to the third aggressor timing window 316E as the more significant subset or filter out the first and the second aggressors from further analyses (e.g., one or more glitch analyses, one or more timing analyses, timing closure, etc.) to determine the impact of glitches on the second victim. That is, these embodiments select only the weakest third aggressor over the first and the second aggressors after accounting for the second victim.

Similar to the selection of a more significant set of aggressor(s) for the first victim, some other embodiments may select a more significant set that includes, for example, only the second aggressor and the third aggressor based at least in part upon their respective strengths and the second susceptibility window 328E. Some other embodiments may select all three aggressors based at least in part upon, for example, a threshold limit of the strength of an aggressor beyond which the aggressor will be selected, although the latter selection will consume more computational resources.

Figure 3F:
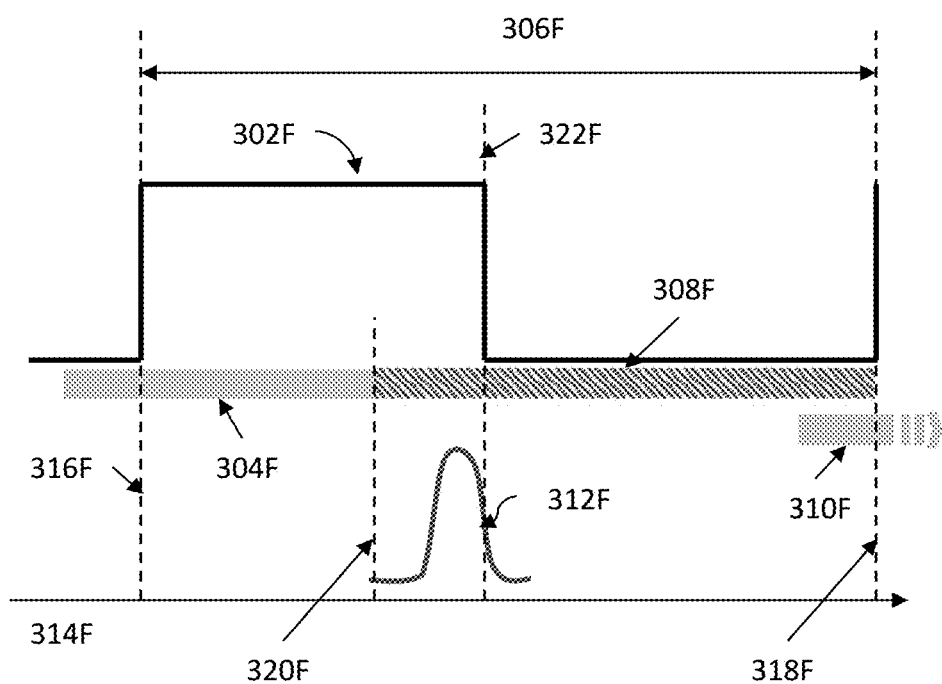
FIG. 3F illustrates a simplified example of determining a glitch window in one or more embodiments.

FIG. 3F illustrates a simplified example of determining a glitch window in one or more embodiments. More particularly, FIG. 3F illustrates a simplified schematic diagram for various terms referenced herein. For the sole purpose of simplifying the illustration and description, 306F represents one period of an ideal clock signal 203F between the rising edge 316F and the next rising edge 318F for a circuit component without analog behavioral modeling (e.g., no ramp-up or ramp-down) of the clock signal having a period of 306F between two consecutive rising edges. It shall be noted that only one full clock cycle is shown in FIG. 3F although the clock signal 302F may include numerous other clock cycles not shown in FIG. 3F. 314F fictitiously illustrates a temporal axis, where the clock signal 302F propagates along the direction 310F.

304F (between the rising edge 316F and one end point of the timing window 320F) represents a timing window (e.g., a required time window) for the clock signal. 308F illustrates an example susceptibility window that may be determined by, for example, subtracting the portion of the timing window 304F (e.g., the portion of 304F within the clock cycle 302F) from the period 306F of the clock signal in one embodiment. In some embodiments, the susceptibility window 308F thus determined represents a more conservative susceptibility window and may thus be considered as a superset of candidate susceptibility windows that are more aggressive and may be determined for the clock signal illustrated in FIG. 3F. For example, a candidate susceptibility window may be a smaller portion (or a proper subset) of the susceptibility window 308F.

312F illustrates an example glitch arriving at the circuit component during the clock cycle 302F. As illustrated in FIG. 3F, the glitch 312F arrives within the clock cycle 302F and has sufficient time to ramp up to its full voltage level before the clock signal shuts down the circuit component (e.g., ideally at the falling edge 322F for the clock cycle 302F). In some embodiments, the glitch 312 may thus change the internal storage or the logic state of the circuit component.

Figure 3G:
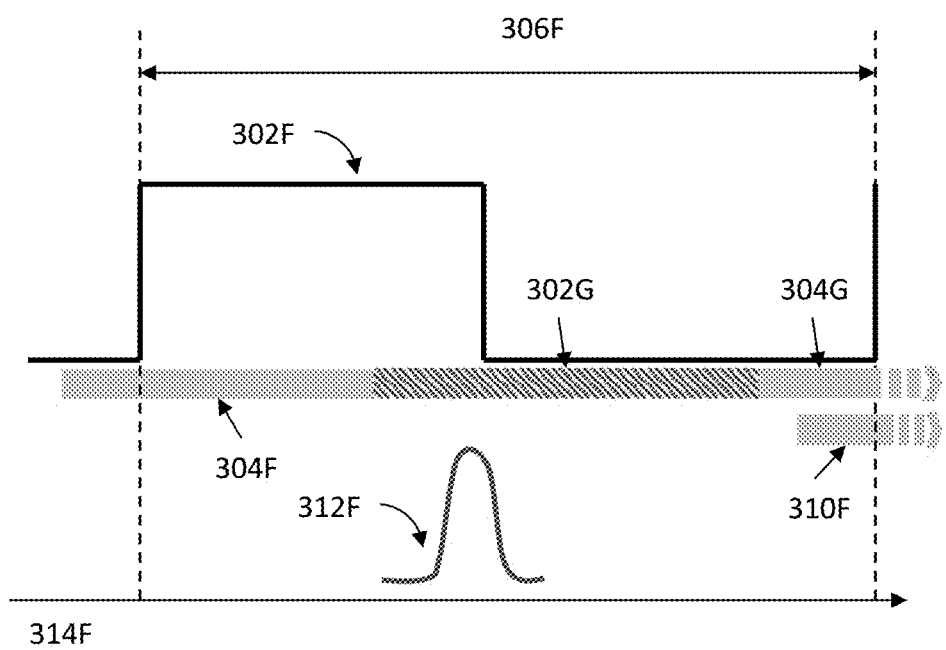
FIG. 3G illustrates another simplified example of determining a glitch window in one or more embodiments.

FIG. 3G illustrates another simplified example of determining a glitch window in one or more embodiments. As described immediately above with reference to FIG. 3F, the susceptibility window 308F may represent the most conservative susceptibility window in some embodiments. FIG. 3G illustrates the determination of a more aggressive or more restrictive (e.g., restricting whether a glitch should be accounted for based at least in part upon a smaller time window illustrated in 302G) susceptibility window 302G. For example, in addition to subtracting a portion of the timing window 304F from the clock period 306F for the clock cycle 302F, some embodiments may further subtract the portion of the timing window 304G of the next clock cycle from the period of the clock cycle 306F to determine the susceptibility window 302G.

In some embodiments, a susceptibility window 302G may be determined by subtracting, in addition to the portion of the timing window 304G of the next clock cycle, another portion within the clock cycle 306F from the period of the clock cycle 306F. More details about determining a susceptibility window are described below.

Figure 3H:
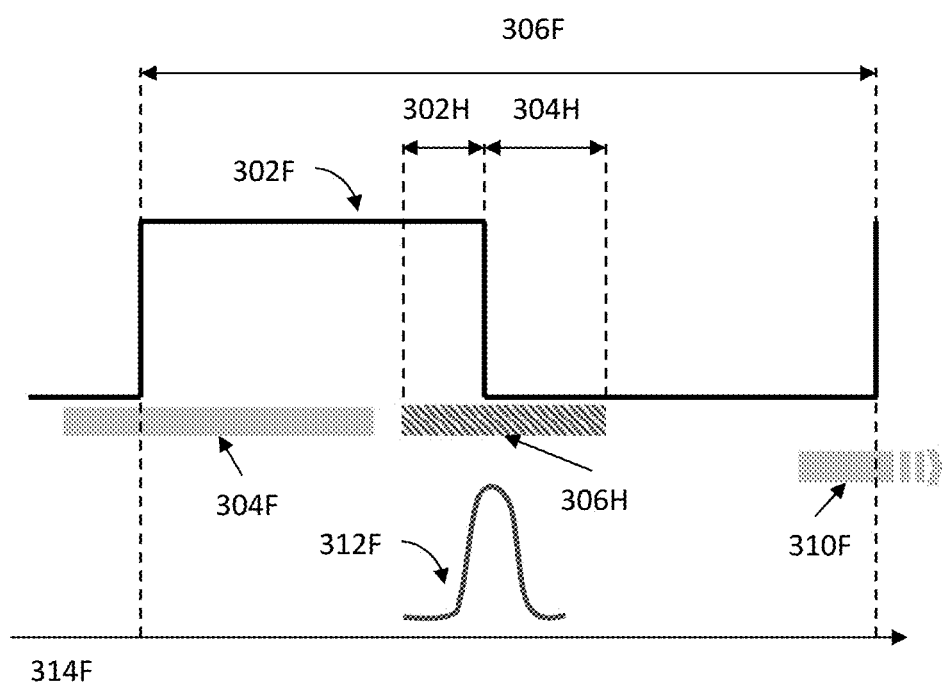
FIG. 3H illustrates another simplified example of determining a glitch window in one or more embodiments.

FIG. 3H illustrates another simplified example of determining a glitch window in one or more embodiments. FIG. 3H illustrates the determination of an even more aggressive or more restrictive susceptibility window 302H plus 304H than the susceptibility window 302G of FIG. 3G. For example, some embodiments may determine the susceptibility window (302H plus 304H) as the sum of the setup time 302H and the hold time 304H.

A setup time is an amount of time before the clock's active edge that the input data must be stable for the data to be correctly latched. In some embodiments, the amount of time subtracted from the period 305F is the minimum amount of time before the clock's active edge that the input data must be stable. A violation of the setup time, which is also known as a setup violation, may cause incorrect data to be captured. A setup violation causes a negative impact on the input data signal. In the case of a glitch, a setup violation may be beneficial because the glitch may not destroy the integrity of the signal of a victim component.

A hold time is an amount of time after the clock's active edge that the input data must be held stable for the data to be latched correctly. A violation of the hold time, also known as a hold violation, may be caused by, for example, the clock signal travelling slower than the input data and may thus allow the input data to penetrate, for example, two registers in the same clock cycle or may destroy the integrity of the latched data. Similar to a setup violation, a hold violation may also cause a negative impact on the input data. In the case of a glitch, a hold violation may also be beneficial because the glitch may not destroy the integrity of the signal of a victim component in the event of a hold violation.

In some of these embodiments illustrated in FIG. 3H, the setup time 302H and the hold time 304H correspond to the glitch 312F and hence the corresponding aggressor whose switching may cause capacitive crosstalk and thus the glitch 312F. Some other embodiments may not necessarily strictly subtract the setup time (302H) and the hold time (304H) from the clock period 306F as the setup and hold time respectively correspond to the minimum amount of time during which the input data (the glitch 312F in these embodiments) need to be held stable. Rather, some of these embodiments may subtract more than just the setup time (302H) from the clock period 306F. For example, some embodiments may subtract (or add in case of a negative amount for subtraction) an additional threshold percentage or threshold portion (e.g., an addition +/−15%, an empirically or user determined threshold portion or amount, or any other suitable additional portion or amount) of the setup time (302H) from the clock cycle 306F. As another example, some embodiments may adjust the susceptibility window 302H with the clock skew (e.g., a positive skew or a negative skew).

In addition or in the alternative, some embodiments may similarly subtract more than just the hold time (304H) from the clock period 306F. For example, some embodiments may subtract (or add in case of a negative amount for subtraction) an additional threshold percentage or threshold portion (e.g., an addition +/−24%, an empirically or user determined threshold portion or amount, or any other suitable additional portion or amount) of the hold time (304H) from the clock cycle 306F. As another example, some embodiments may adjust the susceptibility window 302H with the clock skew (e.g., a positive skew or a negative skew) in determining the susceptibility window 306H.

As described herein, the determination of a susceptibility window for a victim circuit component may be determined in many different ways based at least in part upon, for example, a design choice, a computational resource requirement or balance therefor, an accuracy requirement for the analytical results of one or more subsequent analyses (e.g., a glitch analysis, a timing analysis, a delay calculation, etc.), an expediency requirement for the analytical results, a performance requirement for the electronic design, criticality of the electronic design, criticality of a particular net or even the victim circuit component under consideration, a balance between two or more requirements along an adjustable sliding scale, any other suitable requirements, or any combinations thereof.

It shall be noted that various embodiments described herein refer to a required time window in the respective descriptions for the sole purpose and ease of illustration and description, and that other timing windows (e.g., arrival time) may also be used to achieve identical or substantially similar purposes and are thus also contemplated as a part of the description. It shall be further noted that other timing elements such as slacks (e.g., a positive slack, a negative slack, etc.), delays (e.g., a gate delay of a logic gate), etc. may also be considered in various embodiments described herein to determine, for example, a timing window of an aggressor, a susceptibility window of a victim, etc.

System Architecture Overview

Figure 4:
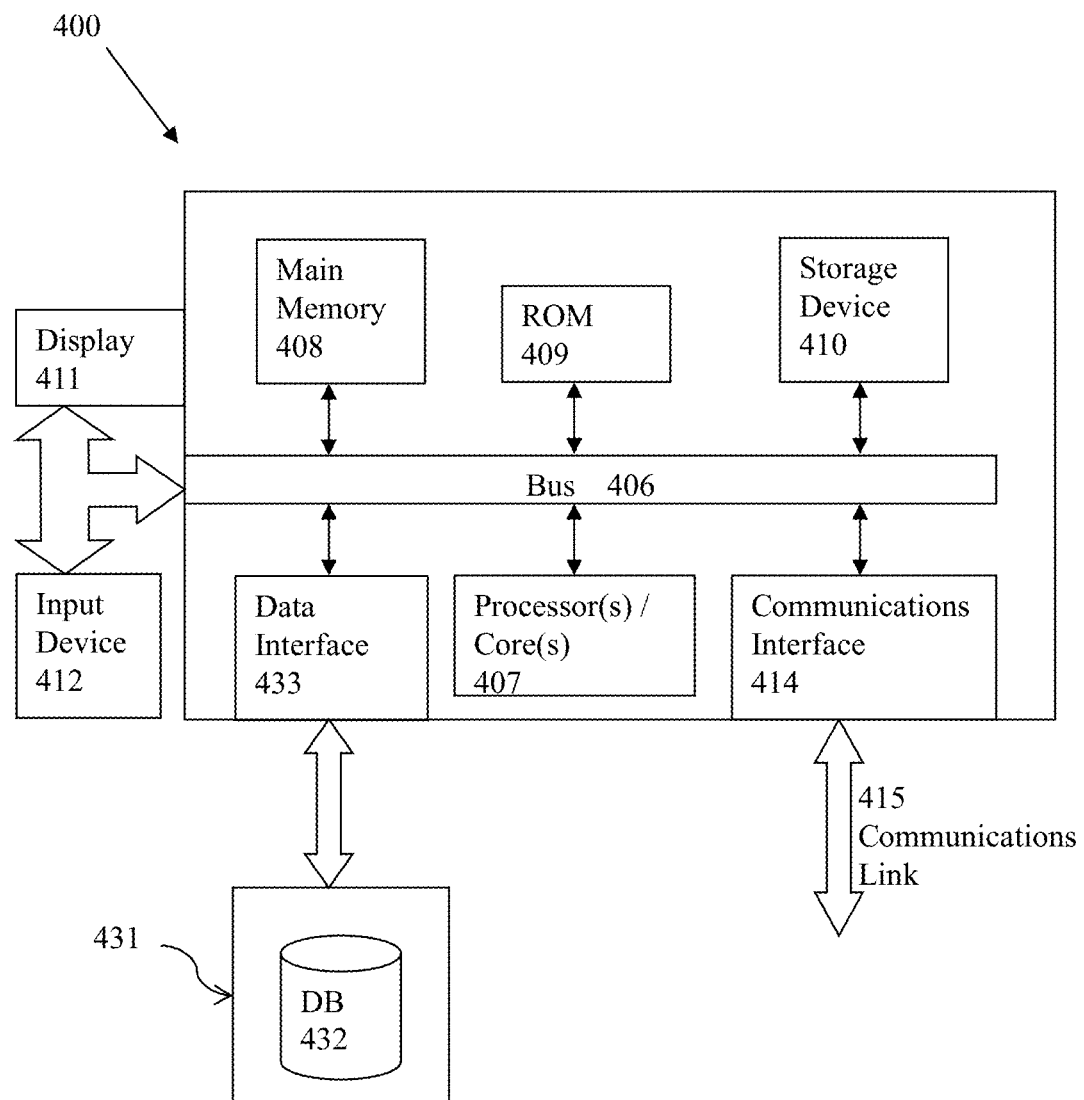
FIG. 4 illustrates a computerized system on which a method for characterizing an electronic design with a susceptibility window may be implemented.

FIG. 4 illustrates a computerized system on which a method for characterizing an electronic design with a susceptibility window may be implemented. Computer system 400 includes a bus 406 or other communication module for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

The illustrative computing system 400 may include an Internet-based computing platform providing a shared pool of configurable computer processing resources (e.g., computer networks, servers, storage, applications, services, etc.) and data to other computers and devices in a ubiquitous, on-demand basis via the Internet in some embodiments. For example, the computing system 400 may include or may be a part of a cloud computing platform (e.g., a public cloud, a hybrid cloud, etc.) where computer system resources (e.g., storage resources, computing resource, etc.) are provided on an on-demand basis, without direct, active management by the users in some embodiments. In some embodiments, the illustrative computing system 400 may be devised providing According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the acts of determination, extraction, simulating, annotating, analyzing, optimizing, and/or identifying, etc. descried herein may be performed by one or more processors, one or more processor cores, or combination thereof.

The term "computer readable storage medium" or "computer usable storage medium" as used herein refers to any non-transitory medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program (e.g., application code) through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 433 may be performed by the communication interface 414.

Various embodiments described herein provide the capability of handling electronic design spanning across multiple design fabrics, each having one or more hierarchical levels and also accommodate different process design kits (PDKs) for different electronic designs. In addition, the described embodiments handle any extracted model spanning across multiple design fabrics. Moreover, for each design fabric, these embodiments need not make a copy of the entire design hierarchy for creating an extracted view. These embodiments also determine an optimal hierarchical level in an electronic design (mono-fabric or cross-fabric) to which the copy of the schematic hierarchy is to be made. These embodiments further provide the capability of reusing existing simulation models for one or more sets of circuit components (e.g., a hierarchical block). Furthermore, these embodiments generate an extracted view where an optimal hierarchical level is determined for each design fabric. As a result, the embodiments described herein fully address the problems with and shortcomings of conventional approaches and drastically improve and expand the capability of conventional approaches.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. Various example embodiments of the invention are described herein. Reference is made to these examples in a non-limiting sense. The examples described herein are provided to illustrate more broadly applicable aspects of the invention. Various changes may be made to any of the examples or embodiments described herein, and equivalents thereof may be substituted without departing from the true spirit and scope of these examples or embodiments described herein. In addition, many modifications may be made to adapt a particular situation, material, composition of matter, system, module, process, and/or process act(s) or step(s) to the objective(s), spirit or scope of the present invention. Further, as will be appreciated by those with skill in the art, each of the individual variations, examples, and/or embodiments, etc. described and illustrated herein has discrete components and features which may be readily separated from or combined with the feature or features of any of the other several variations, examples, and/or embodiments, etc., without departing from the scope or spirit of various variations, examples, and/or embodiments, etc. described herein. All such modifications are intended to be within the scope of claims associated with this disclosure. Moreover, various embodiments or portion(s) thereof described herein may be combined to provide further embodiments. Any aspects of the embodiments may be modified, if necessary, to employ concepts of the various variations, examples, and/or embodiments, etc. described herein to provide yet further embodiments.

We claim:

1. A computer implemented method for characterizing an electronic design with a susceptibility window, comprising:
identifying a set of multiple aggressors in an electronic design;
determining, at a susceptibility window module stored in memory and executing in conjunction with a microprocessor of a computing node, a susceptibility window for an internal node of a victim and a timing window for the set of multiple aggressors in the electronic design;
determining a subset having at least one aggressor using at least the susceptibility window of the victim and the timing window for the set of multiple aggressors;
determining a complementary window for the internal node based at least in part upon a clock signal for the internal node and the timing window for the subset; and
determining whether a glitch in the electronic design causes a violation at the internal node of the electronic design using at least the subset based at least in part upon the complementary window and the susceptibility window.

2. The computer implemented method of claim 1, wherein determining the susceptibility window comprises:
determining a different timing window at a different location; and
propagating the different timing window for the victim backwards for the internal node along a net or a net segment on which the internal node is located.

3. The computer implemented method of claim 2, wherein determining the susceptibility window comprises:
determining the susceptibility window for the internal node of the victim based at least in part upon the different timing window.

4. The computer implemented method of claim 1, wherein determining the timing window for the set of multiple aggressors comprises:
determining a different timing window at a different location; and
propagating the different timing window for the set of multiple aggressors backwards along one or more nets or one or more net segments on which the set of multiple aggressors is located.

5. The computer implemented method of claim 4, wherein determining the timing window for the set of multiple aggressors comprises:
determining the timing window for the set of multiple aggressors based at least in part upon the different timing window.

6. The computer implemented method of claim 3, wherein determining the susceptibility window for the internal node of the victim comprises:
identifying a clock period for the clock signal pertaining to a node on the net or the net segment; and
determining the complementary window for the node based at least in part upon the clock period and the timing window.

7. The computer implemented method of claim 6, wherein determining the susceptibility window for the internal node of the victim comprises:
determining a different susceptibility window for the node based at least in part upon the complementary window; and
determining the susceptibility window for the internal node at least by propagating the different susceptibility window for the node backward from the node to the internal node along the net or the net segment.

8. The computer implemented method of claim 5, wherein determining the timing window for the set of multiple aggressors comprises:
identifying a clock period for the clock signal pertaining to a node on the net or the net segment; and
determining the complementary window for the node based at least in part upon the clock period.

9. The computer implemented method of claim 8, wherein determining the timing window for the set of multiple aggressors comprises:
determining a separate timing window for the node based at least in part upon the complementary window; and
determining the timing window for the set of aggressors at least by propagating the separate timing window for the node backward along the net or the net segment.

10. The computer implemented method of claim 1, wherein determining the subset having the at least one aggressor comprises:
determining a grid of events having one or more segments based at least in part upon the timing window of the set of multiple aggressors.

11. The computer implemented method of claim 10, wherein determining the subset having the at least one aggressor comprises:
for a segment of the one or more segments of the grid of events, determining a respective set of one or more aggressors that are active in the segment of the one or more segments of the grid of events.

12. The computer implemented method of claim 11, wherein
determining the subset having the at least one aggressor comprises:
determining a different segment from the one or more segments based at least in part upon the timing window of the respective set of one or more aggressors and further on the susceptibility window of the victim.

13. A system for characterizing an electronic design with a susceptibility window, comprising:
a microprocessor; and
a non-transitory computer accessible storage medium storing thereupon a sequence of instructions which, when executed by the microprocessor, causes the microprocessor at least to:
identify a set of multiple aggressors in an electronic design;
determine, at a susceptibility window module stored in memory and executing in conjunction with a microprocessor of a computing node, a susceptibility window for an internal node of a victim and a timing window for the set of multiple aggressors in the electronic design;
determine a subset having at least one aggressor using at least the susceptibility window of the victim and the timing window for the set of multiple aggressors;
determine a complementary window for the internal node based at least in part upon a clock signal for the internal node and the timing window for the set of multiple aggressors; and
determine whether a glitch in the electronic design causes a violation at the internal node of the electronic design based at least in part upon the complementary window and the susceptibility window.

14. The system for claim 13, wherein the sequence of instructions which, when executed by the microprocessor, causes the microprocessor to determine the susceptibility window further comprises instructions whose execution further causes the microprocessor to:
   determine a different timing window at a different location;
   propagate the different timing window for the victim backwards for the internal node along a net or a net segment on which the internal node is located; and
   determine the susceptibility window for the internal node of the victim based at least in part upon the different timing window.

15. The system for claim 13, wherein the sequence of instructions which, when executed by the microprocessor, causes the microprocessor to determine the timing window for the set of multiple aggressors further comprises instructions whose execution further causes the microprocessor to:
   determine a different timing window at a different location;
   propagate the different timing window for the set of multiple aggressors backwards along one or more nets or one or more net segments on which the set of multiple aggressors is located; and
   determining the timing window for the set of multiple aggressors based at least in part upon the different timing window.

16. The system for claim 14, wherein the sequence of instructions which, when executed by the microprocessor, causes the microprocessor to determine the susceptibility window for the internal node of the victim further comprises instructions whose execution further causes the microprocessor to:
   identify a clock period for the clock signal pertaining to a node on the net or the net segment;
   determine the complementary window for the internal node based at least in part upon the clock period and the timing window;
   determine a different susceptibility window for the node based at least in part upon the complementary window; and
   determine the susceptibility window for the internal node at least by propagating the different susceptibility window for the node backward from the node to the internal node along the net or the net segment.

17. The system for claim 13, wherein the sequence of instructions which, when executed by the microprocessor, further causes the microprocessor to:
   determine a grid of events having one or more segments based at least in part upon the timing window of the set of multiple aggressors;
   for a segment of the one or more segments of the grid of events, determine a respective set of one or more aggressors that are active in the segment of the one or more segments of the grid of events; and
   determine a different segment from the one or more segments based at least in part upon the timing window of the respective set of one or more aggressors and further on the susceptibility window of the victim.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for characterizing an electronic design with a susceptibility window, the set of acts comprising:
   identifying a set of multiple aggressors in an electronic design;
   determining, at a susceptibility window module stored in memory and executing in conjunction with a microprocessor of a computing node, a susceptibility window for an internal node of a victim and a timing window for the set of multiple aggressors in the electronic design;
   determining a subset having at least one aggressor using at least the susceptibility window of the victim and the timing window for the set of multiple aggressors;
   determining a complementary window for the internal node based at least in part upon a clock signal for the internal node and the timing window for the set of multiple aggressors; and
   determining whether a glitch in the electronic design causes a violation at the internal node of the electronic design based at least in part upon the complementary window and the susceptibility window.

19. The article of manufacture of claim 18, the set of acts further comprising:
   determining a different timing window at a different location;
   propagating the different timing window for the victim backwards for the internal node along a net or a net segment on which the internal node is located; and
   determining the susceptibility window for the internal node of the victim based at least in part upon the different timing window.

20. The article of manufacture of claim 18, the set of acts further comprising:
   determining a different timing window at a different location;
   propagating the different timing window for the set of multiple aggressors backwards along one or more nets or one or more net segments on which the set of multiple aggressors is located; and
   determining the timing window for the set of multiple aggressors based at least in part upon the different timing window.

21. The article of manufacture of claim 18, the set of acts further comprising:
   identifying a clock period for the clock signal pertaining to a node on the net or the net segment;
   determining the complementary window for the node based at least in part upon the clock period;
   determining a separate timing window for the node based at least in part upon the complementary window; and
   determining the timing window for the set of aggressors at least by propagating the separate timing window for the node backward along the one or more nets or the one or more net segments.

22. The article of manufacture of claim 18, the set of acts further comprising:
   determining a grid of events having one or more segments based at least in part upon the timing window of the set of multiple aggressors;
   for a segment of the one or more segments of the grid of events, determining a respective set of one or more aggressors that are active in the segment of the one or more segments of the grid of events; and
   determining a different segment from the one or more segments based at least in part upon the timing window of the respective set of one or more aggressors and further on the susceptibility window of the victim.

* * * * *